United States Patent
Schwintek et al.

(10) Patent No.: US 11,034,270 B2
(45) Date of Patent: Jun. 15, 2021

(54) HEATED AND COOLED SEAT

(71) Applicant: Indian Motorcycle International, LLC, Medina, MN (US)

(72) Inventors: Scott M. Schwintek, St. Anthony, MN (US); Kent A. Underland, Willmar, MN (US); Trevor A. Carlson, Minneapolis, MN (US)

(73) Assignee: Indian Motorcycle International, LLC, Medina, MN (US)

( * ) Notice: Subject to any disclaimer, the term of this patent is extended or adjusted under 35 U.S.C. 154(b) by 308 days.

(21) Appl. No.: 16/106,081

(22) Filed: Aug. 21, 2018

(65) Prior Publication Data

US 2019/0061574 A1    Feb. 28, 2019

Related U.S. Application Data

(60) Provisional application No. 62/549,665, filed on Aug. 24, 2017.

(51) Int. Cl.
| | |
|---|---|
| *B62J 33/00* | (2006.01) |
| *B60N 2/56* | (2006.01) |
| *B60N 2/40* | (2006.01) |
| *B62J 1/08* | (2006.01) |
| *B62J 1/12* | (2006.01) |

(Continued)

(52) U.S. Cl.
CPC ............ *B60N 2/5642* (2013.01); *B60N 2/40* (2013.01); *B60N 2/565* (2013.01); *B60N 2/5621* (2013.01); *B60N 2/5657* (2013.01); *B62J 1/08* (2013.01); *B62J 1/12* (2013.01); *B62J 1/28* (2013.01); *B62J 33/00* (2013.01); *B62J 17/00* (2013.01); *B62K 11/00* (2013.01)

(58) Field of Classification Search
CPC .......... B62J 33/00; B62J 50/30; B60N 2/565; B60N 2/5657
See application file for complete search history.

(56) References Cited

U.S. PATENT DOCUMENTS

| | | | |
|---|---|---|---|
| 1,011,574 A | 12/1911 | Carron | |
| 5,934,748 A * | 8/1999 | Faust .................. | B60N 2/5635 297/180.1 |

(Continued)

FOREIGN PATENT DOCUMENTS

| | | |
|---|---|---|
| JP | 2016-124397 A | 7/2016 |
| WO | WO-2016025776 A1 * | 2/2016 ........... B60N 2/5664 |

OTHER PUBLICATIONS

International Search Report for International Application PCT/US2018/047978; dated Dec. 12, 2018.

(Continued)

*Primary Examiner* — Timothy J Brindley
(74) *Attorney, Agent, or Firm* — Harness, Dickey & Pierce, P.L.C.

(57) ABSTRACT

A seat assembly for a vehicle having a longitudinal axis includes a seat pan, a cover support adjacent to the seat pan, and a seat cover that has an upper surface, a first longitudinally extending side surface and a second longitudinally extending side surface. A heating and cooling module is disposed at least partially within the cover support. The seat assembly further comprises a first air inlet in communication with the heating and cooling module. The first air inlet communicates air from a first port in the seat cover to the heating and cooling module.

15 Claims, 22 Drawing Sheets

(51) Int. Cl.
    *B62J 1/28*    (2006.01)
    *B62J 17/00*   (2020.01)
    *B62K 11/00*   (2006.01)

(56) References Cited

U.S. PATENT DOCUMENTS

| | | | | |
|---|---|---|---|---|
| 6,196,627 | B1* | 3/2001 | Faust | B60N 2/5635 |
| | | | | 297/180.1 |
| 6,277,023 | B1* | 8/2001 | Schwarz | B60N 2/5635 |
| | | | | 297/180.14 |
| 6,808,230 | B2* | 10/2004 | Buss | B60N 2/5657 |
| | | | | 297/180.12 |
| 10,471,864 | B1* | 11/2019 | Tait | B60N 2/565 |
| 10,500,994 | B1* | 12/2019 | Dry | F25B 21/04 |
| 10,744,915 | B2* | 8/2020 | McElroy | B60N 2/5657 |
| 2005/0161193 | A1* | 7/2005 | McKenzie | B60N 2/5678 |
| | | | | 165/73 |
| 2006/0219686 | A1 | 10/2006 | Oishi et al. | |
| 2006/0279113 | A1 | 12/2006 | Pautz | |
| 2007/0045292 | A1* | 3/2007 | Yamada | B60N 2/5685 |
| | | | | 219/553 |
| 2007/0101729 | A1* | 5/2007 | Aoki | B60H 1/00285 |
| | | | | 62/3.61 |
| 2007/0257541 | A1 | 11/2007 | Browne et al. | |
| 2009/0015043 | A1* | 1/2009 | Macht | B60N 2/5657 |
| | | | | 297/180.14 |
| 2009/0242539 | A1 | 10/2009 | Wassel | |
| 2010/0038067 | A1* | 2/2010 | Flynn | B62J 33/00 |
| | | | | 165/202 |
| 2010/0300644 | A1* | 12/2010 | Chung | B60N 2/5678 |
| | | | | 165/41 |
| 2010/0314191 | A1 | 12/2010 | Deckard et al. | |
| 2011/0133525 | A1* | 6/2011 | Oota | B60N 2/5657 |
| | | | | 297/180.14 |
| 2012/0080911 | A1* | 4/2012 | Brykalski | B60N 2/565 |
| | | | | 297/180.15 |
| 2012/0144844 | A1 | 6/2012 | Park et al. | |
| 2012/0256450 | A1* | 10/2012 | Sahashi | B60N 2/5657 |
| | | | | 297/180.14 |
| 2013/0299128 | A1* | 11/2013 | Bergamini | B60H 1/00207 |
| | | | | 165/59 |
| 2014/0179212 | A1* | 6/2014 | Space | B60N 2/5657 |
| | | | | 454/76 |
| 2014/0327320 | A1 | 11/2014 | Muhs et al. | |
| 2015/0318732 | A1 | 11/2015 | Heine et al. | |
| 2016/0009206 | A1* | 1/2016 | Perraut | B60N 2/5635 |
| | | | | 297/180.12 |
| 2016/0272038 | A1* | 9/2016 | Tanaka | B60N 2/5657 |
| 2016/0347218 | A1 | 12/2016 | Akaike et al. | |
| 2017/0094727 | A1 | 3/2017 | Saunamaki | |
| 2017/0144571 | A1* | 5/2017 | Chiba | B60N 2/914 |
| 2017/0164757 | A1* | 6/2017 | Thomas | B60N 2/5678 |
| 2017/0274951 | A1* | 9/2017 | Xicola Serrano | B62J 1/00 |
| 2018/0065524 | A1* | 3/2018 | Bauer | B60N 2/5635 |
| 2018/0216780 | A1 | 8/2018 | Oltmans | |
| 2019/0061574 | A1* | 2/2019 | Schwintek | B62J 33/00 |
| 2019/0077228 | A1* | 3/2019 | Goto | B60H 3/0021 |
| 2019/0152362 | A1* | 5/2019 | Kondo | B60N 2/565 |
| 2019/0337429 | A1* | 11/2019 | McElroy | B60H 1/00285 |
| 2020/0216133 | A1* | 7/2020 | Rafferty | B62J 45/416 |

OTHER PUBLICATIONS

U.S. Appl. No. 16/735,077, filed Jan. 6, 2020, Rafferty et al.
U.S. Appl. No. 16/734,846, filed Jan. 6, 2020, Fuchs et al.

* cited by examiner

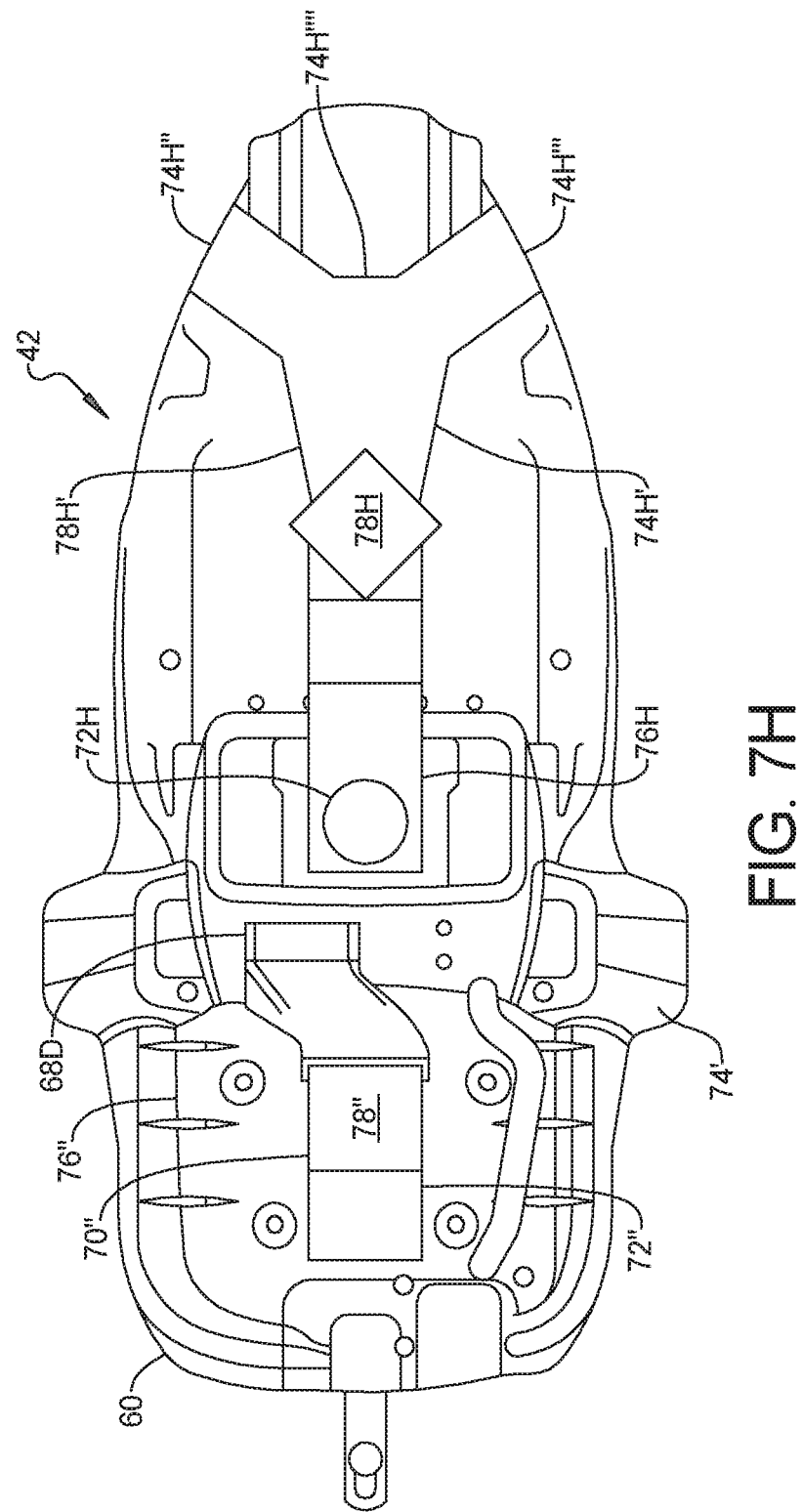

HEATED AND COOLED SEAT

CROSS-REFERENCE TO RELATED APPLICATIONS

This application claims the benefit of U.S. Provisional Application No. 62/549,665 filed on Aug. 24, 2017. The entire disclosure of the above application is incorporated herein by reference.

FIELD

The present disclosure relates to a seat for a vehicle and, more particularly, to a heated and cooled seat.

BACKGROUND

This section provides background information related to the present disclosure which is not necessarily prior art.

Providing a comfortable seat for a vehicle has been a goal for vehicle providers for years. Innovations such as heated and cooled seats have made driving vehicles more comfortable. A typical automotive cooled seat draws air into the heated and cooled seat from under the seat. Open-air vehicles such as a motorcycle generate a large amount of heat close to the occupant and specifically under the seat. With an engine so close to the rider, air from under the seat is at a relatively high temperature and not suitable for cooling the seat.

SUMMARY

This section provides a general summary of the disclosure, and is not a comprehensive disclosure of its full scope or all of its features.

The present disclosure provides an improved heating and cooling configuration for a vehicle seat or seats. While the system is suitable for various types of automotive vehicles, the configuration set forth herein provides a configuration particularly suitable for motorcycles and open air vehicles.

In one aspect of the disclosure, a seat assembly for a vehicle having a longitudinal axis includes a seat pan, a cover support adjacent to the seat pan, a seat cover comprising an upper surface and a first longitudinally extending side surface and a second longitudinally extending side surface and a heating and cooling module disposed at least partially within the cover support. The seat assembly further comprises an inlet air duct in communication with the heating and cooling module. The first air inlet communicates air from a first port in the seat cover to the heating and cooling module.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7H is a seventh alternate top view of the seat pan having a passenger heating and cooling module and a driver heating and cooling module;

Corresponding reference numerals indicate corresponding parts throughout the several views of the drawings.

DETAILED DESCRIPTION

Example embodiments will now be described more fully with reference to the accompanying drawings. Although the following description includes several examples of a motorcycle application, it is understood that the features herein may be applied to any appropriate vehicle, such as snowmobiles, all-terrain vehicles, utility vehicles, moped and scooters. The embodiments disclosed below are not intended to be exhaustive or to limit the invention to the precise forms disclosed in the following detailed description. Rather, the embodiments are chosen and described so that others skilled in the art may utilize their teachings.

Figure 1:
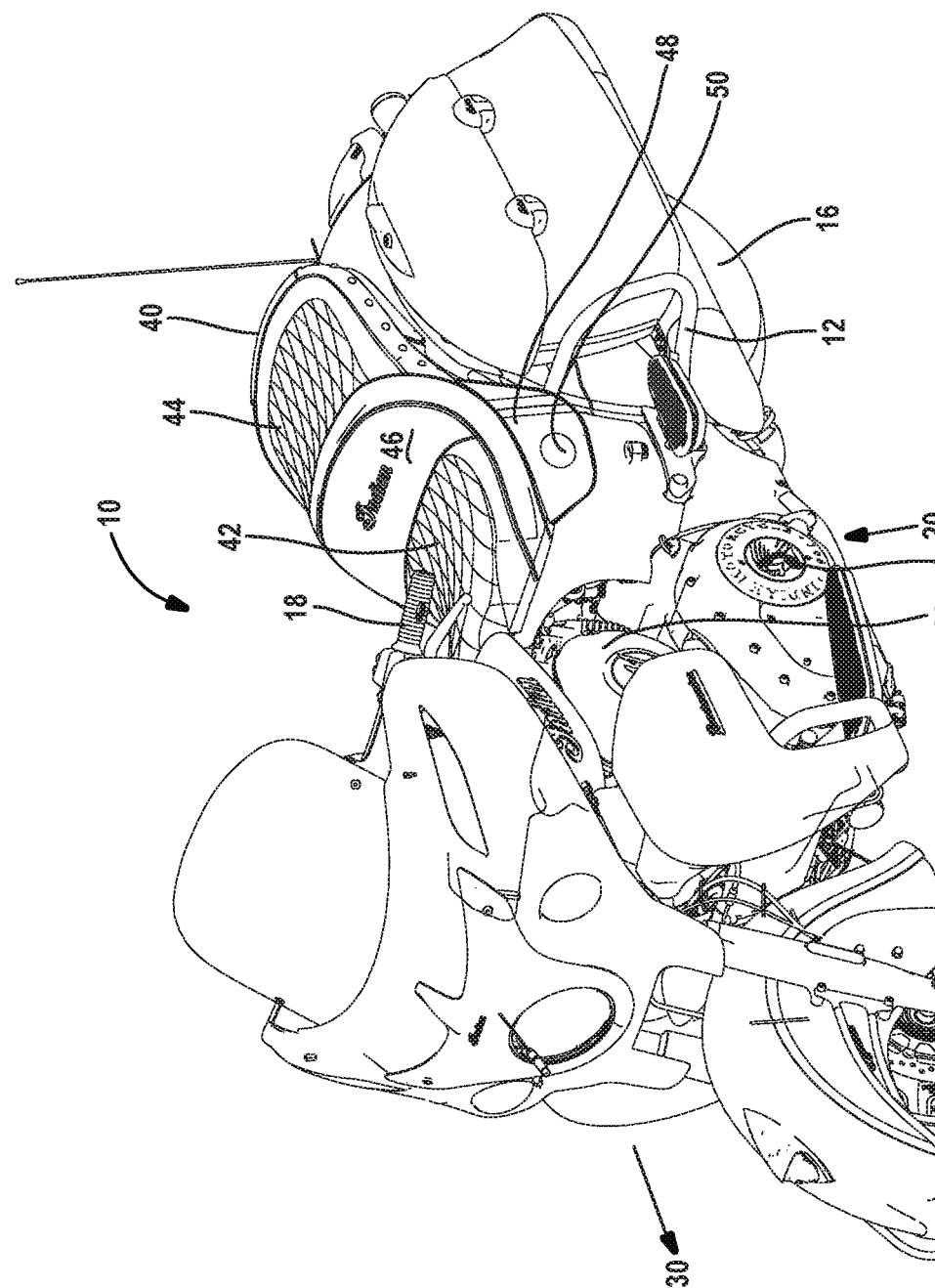
FIG. 1 is a perspective view of the cool side of the vehicle.
Figure 2:
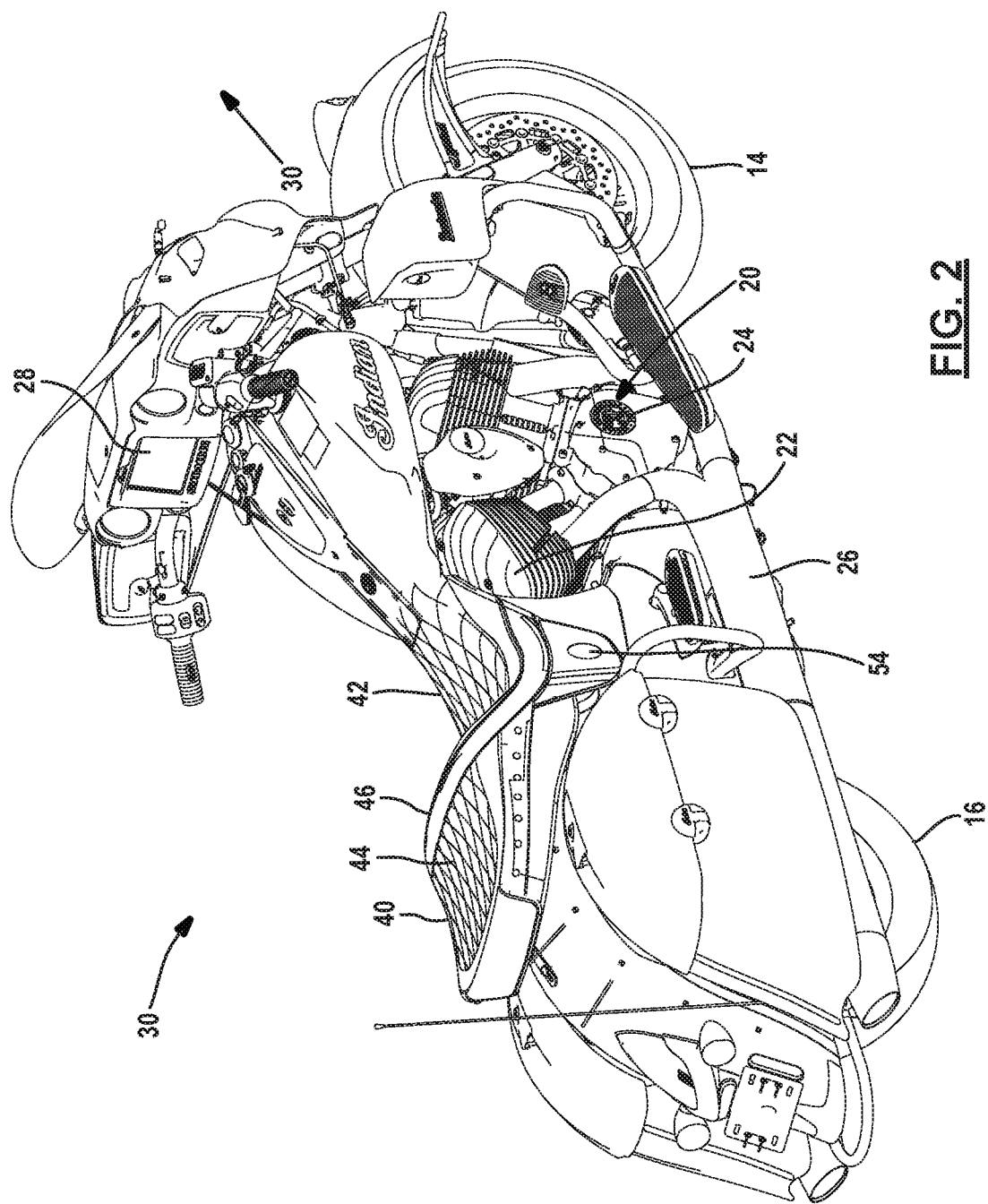
FIG. 2 is a perspective view showing the heated side of the vehicle.

Referring now to FIGS. 1 and 2, a vehicle 10 is illustrated. The vehicle 10 in this example is a two-wheeled vehicle. The two-wheeled vehicle 10 illustrated is a touring style motorcycle. However, the present example is also applicable to other types of vehicles including snowmobiles, scooters, utility vehicles, off-road vehicles and side-by-side vehicles that accommodate passengers in a one of many seating positions The vehicle 10 includes a frame 12 that is used to support the vehicle components including wheels 14 and 16. Wheel 14 is a front wheel which is coupled to the handlebars 18 for by way of a first fork for steering. The rear wheel 16 is a coupled to a powertrain assembly 20 that is used to provide the rotational force to the rear wheel 16, in this example. Of course, all of the wheels on a vehicle or a selected few of the wheels may be coupled to the powertrain assembly 20. The powertrain assembly 20 includes an engine 22 and transmission 24. The powertrain assembly 20 may also include an exhaust pipe 26 that removes waste exhaust from the engine 22. The waste exhaust is at a relatively high temperature compared to the ambient temperatures through which vehicles typically travel. Because the exhaust pipe 26 extends from the engine 22, as is best illustrated in FIG. 2, the right side of the vehicle, in this example, is referred to as the heated side of the vehicle. In FIG. 1, by contrast, there is no exhaust pipe extending from the left side of the engine 22 and therefore the left side of the vehicle in this example is referred to as the cooled side of the vehicle. Note that the exhaust configuration may include exhaust pipes on both sides and/or under the engine 22.

A display panel 28 may be used to provide various information to the driver of the vehicle. The display panel 28 may include a touch screen that provides various user interface for various functions. The display panel 28 in relation to a seating configuration is described in further detail below.

The vehicle 10 also has a longitudinal axis 30 that extends in the direction of forward travel of the vehicle 10 that extends from the front wheel 14 to the rear wheel 16.

The frame 12 may also be used to support a seat assembly 40. The seat assembly 40 can include a driver seating position 42 and a passenger seating position 44. In this example, the driver seating position 42 and the passenger seating position 44 are part of a unitary construction of the seat assembly 40 in which the passenger seating position 44 is higher (relative to the road during driving) than the driver seating position. In other types of vehicles, the driver position 42 and the passenger position 44 may be separated into two separate seats. Alternately, there may be only a single driver seat.

Figure 3A:
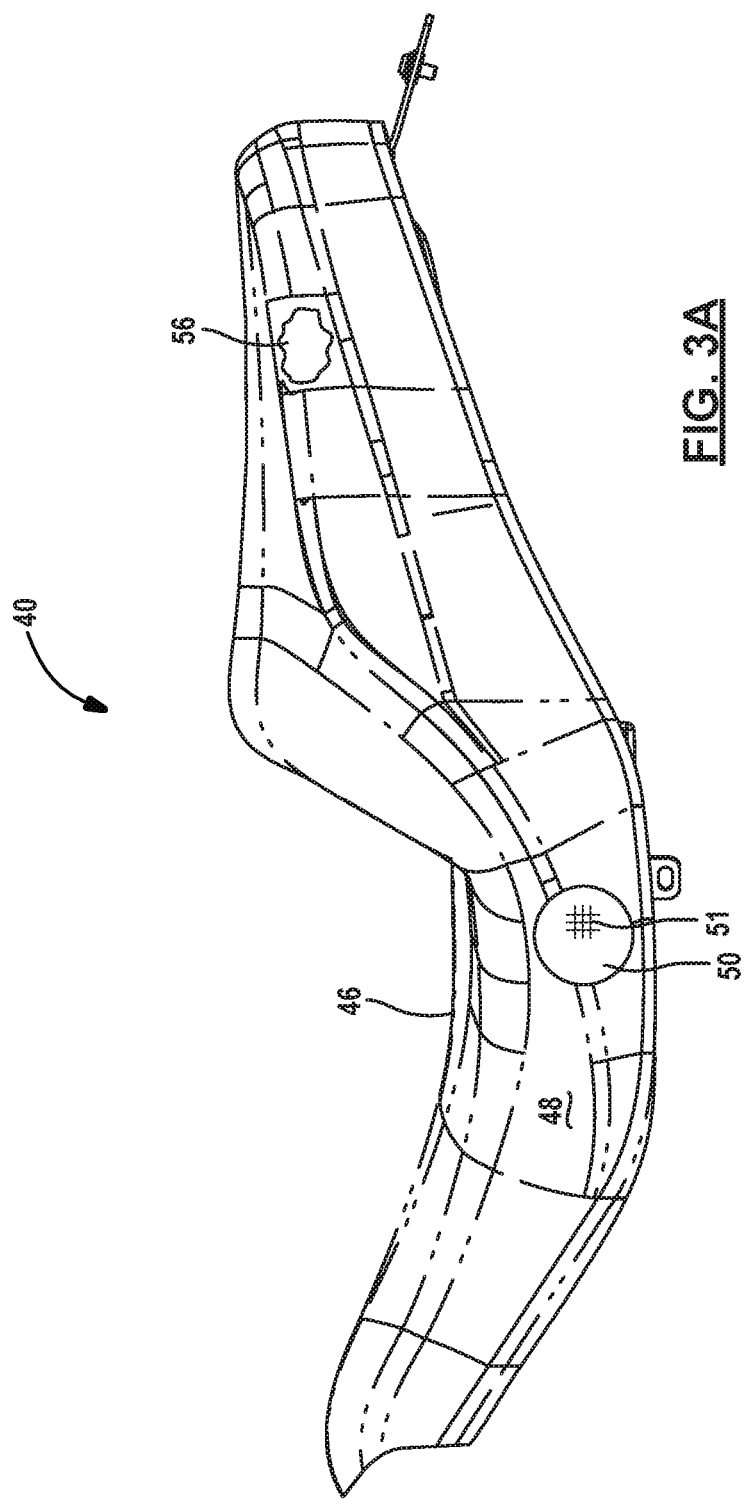
FIG. 3A is a left side view of a seat according to the present disclosure.
Figure 3B:
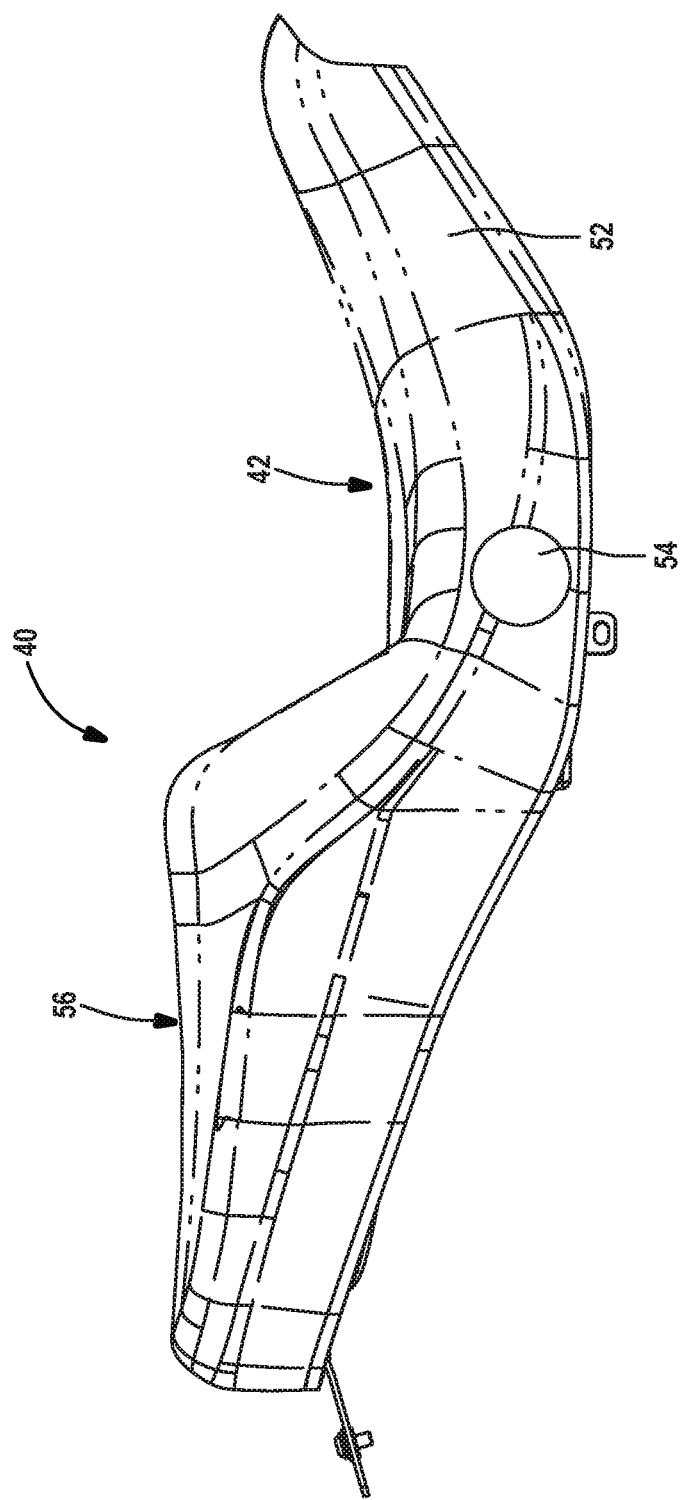
FIG. 3B is a right side view of the seat of FIG. 3A.

Referring now additionally to FIGS. 3A and 3B, the seat assembly 40 is illustrated in further detail. FIG. 3A shows a side view of the seat assembly 40. FIGS. 3A and 3B illustrate the seat cover 46 that has a first longitudinally extending side 48 corresponding to a first longitudinally extending side of the seat assembly 40. The first side 48 extends in a generally in a vertical plane of the vehicles and generally perpendicular to the road plane when the vehicle is in an upright position. An inlet port 50 is disposed within the first longitudinally extending side 48 of the cover 46. The port 50 may provide an opening so that air may be drawn into a heating and cooling system as will be described in further detail below. The port 50 may have a covering that is formed of a hydrophobic mesh material 51 to reduce an amount of water entering the port 50.

A second longitudinally extending side 52 on the opposite side of the seat from the first longitudinally extending side 48 may have a port 54. The port 4 may be blank or filled in if no seat air exhaust is required on that side of the vehicle. The port 54 may be used for exhausting air from the seat assembly 40.

Within the seat cover 46, a cover support 56 such as a cushion is formed from a foam material. The cover support 56 is used for supporting a driver and a passenger and may be used for housing the heating and cooling module as described below.

Figure 4:
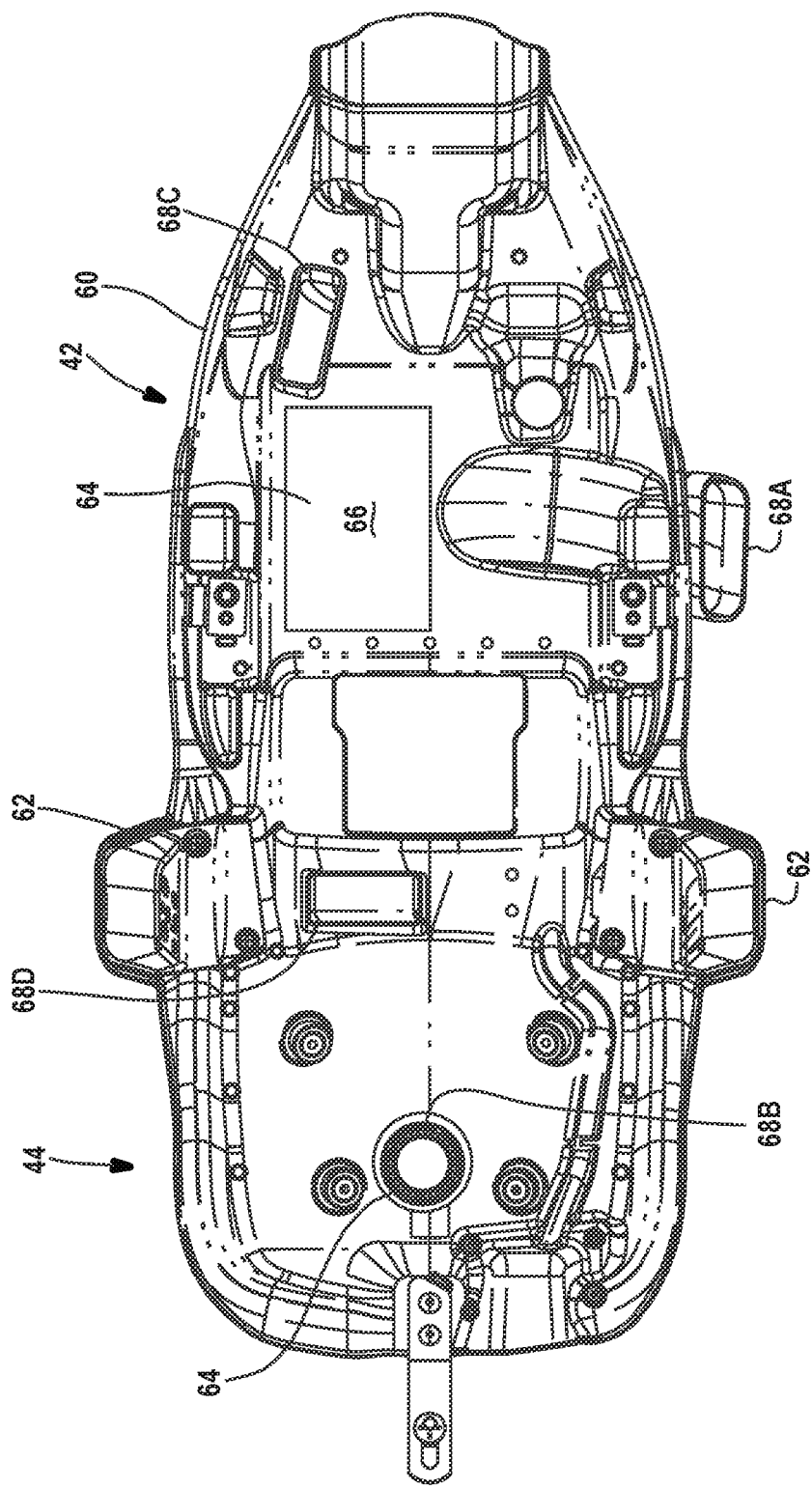
FIG. 4 is a bottom view of a seat pan.

Referring now to FIG. 4, a seat pan 60 is shaped to support the cover support 56 and the cover 46. The seat pan 60 is used for mounting the seat assembly to the frame 12. The seat pan 60 includes bezel openings 62. Bezel openings 62 may be included on one or both sides of the seat pan 60. The bezel opening 62 may be used for a switch control bezel. If switch controls are not used in the seat assembly 40, then the bezel opening 62 may be eliminated or filled with a blank panel.

The seat pan 60 may also include a service opening 64 filled by a removable service panel 66. The location of the service opening 64 is sized to allow a service technician to remove and replace the entire heating and cooling module or components of the heating and cooling module. These components may include a fan, a heat exchanger or ducts as will be described below.

The seat pan 60 may also include an air inlet ports 68A, 68B and air outlet ports 68C, 68D. The air inlet port 68A and air outlet port 68C of the seat pan 60 correspond to the driver position 42. The air inlet port 68B and the air outlet port 68D correspond to the passenger position 44.

Figure 5A:
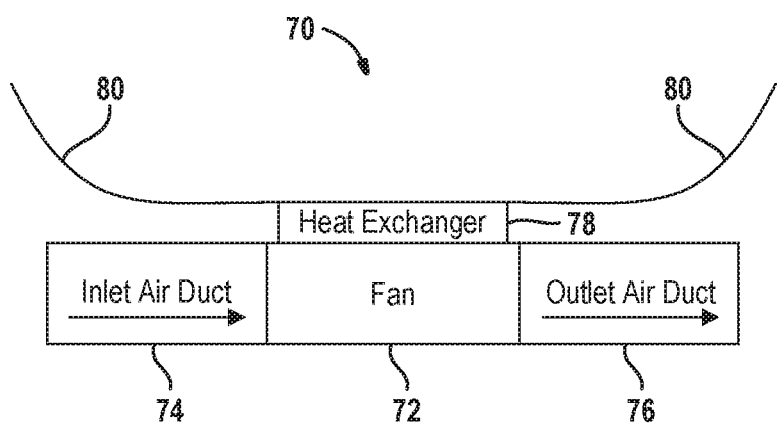
FIG. 5A is a block diagrammatic view of a heating and cooling module.

Referring now to FIG. 5A, the heating and cooling module 70 includes a fan 72 that is in communication with an air inlet such as an inlet air duct 74 and an air outlet such as an outlet air duct 76. The air inlet and air outlet may have a discrete duct or may be a passage in the seat pan or seat support or cushion. In this example, the fan 72 is coupled to a heat exchanger 78. The heat exchanger 78 is in thermal communication with one or more heating elements 80. The heat exchanger 78 can remove heat from the heating elements 80 and remove the waste heat through the air travelling through the inlet air duct 74, the fan 72 and the outlet air duct 76. The system may also operate in a thermally reversed manner in which the heat contained within the air of the inlet air duct 74 may be removed using the heat exchanger 78 so that that the heating elements 80 is cooled.

The heating module 70 may use liquid or thin film technology. For example, the heating elements 80 may be formed from a thermally conductive material such as graphene or carbon nanotubes. The heating elements 80 may be located between the cover support 56 and the cover 46 described above in FIGS. 3A and 3B. Foam or other material may be disposed between the cover and the heating elements 80 to hide the feel or look of the heating element. The heating element 80 may be a flexible material to conform to the shape of the seat assembly 40 and seat cover 46, or both during operation and during inactive times.

Figure 5B:
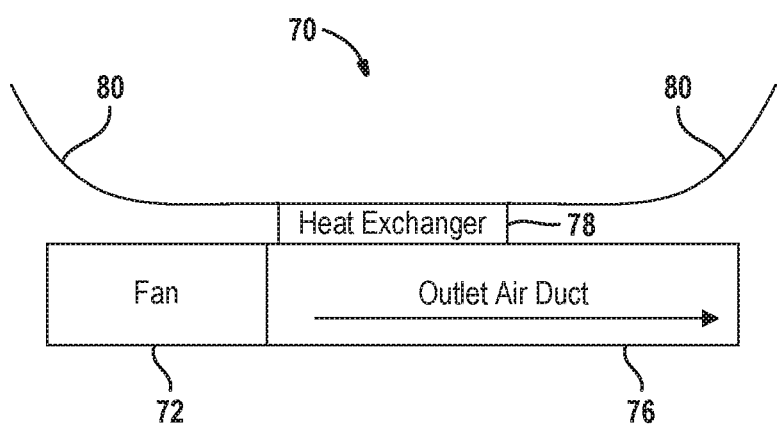
FIG. 5B is a block diagrammatic view of a second example of the heating and cooling module without an inlet air duct.

In FIG. 5B, the inlet air duct of FIG. 5A has been removed. In this case the fan 72 may be placed directly adjacent to the inlet port 50 of the seat cover 46 without a corresponding inlet air duct. The heat exchanger 78 and the fan 72 may be separated in any example including those with both inlet and outlet air ducts.

Figure 5C:
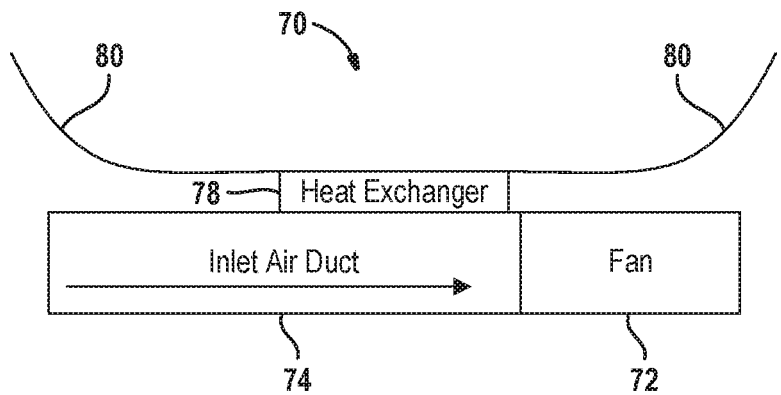
FIG. 5C is a block diagrammatic view of a second example of the heating and cooling module without an outlet air duct.

In FIG. 5C the outlet air duct of FIG. 5A has been removed. In this case the fan 72 may be placed directly adjacent to outlet port in the seat cover or seat pan for exhausting air.

Figure 6:
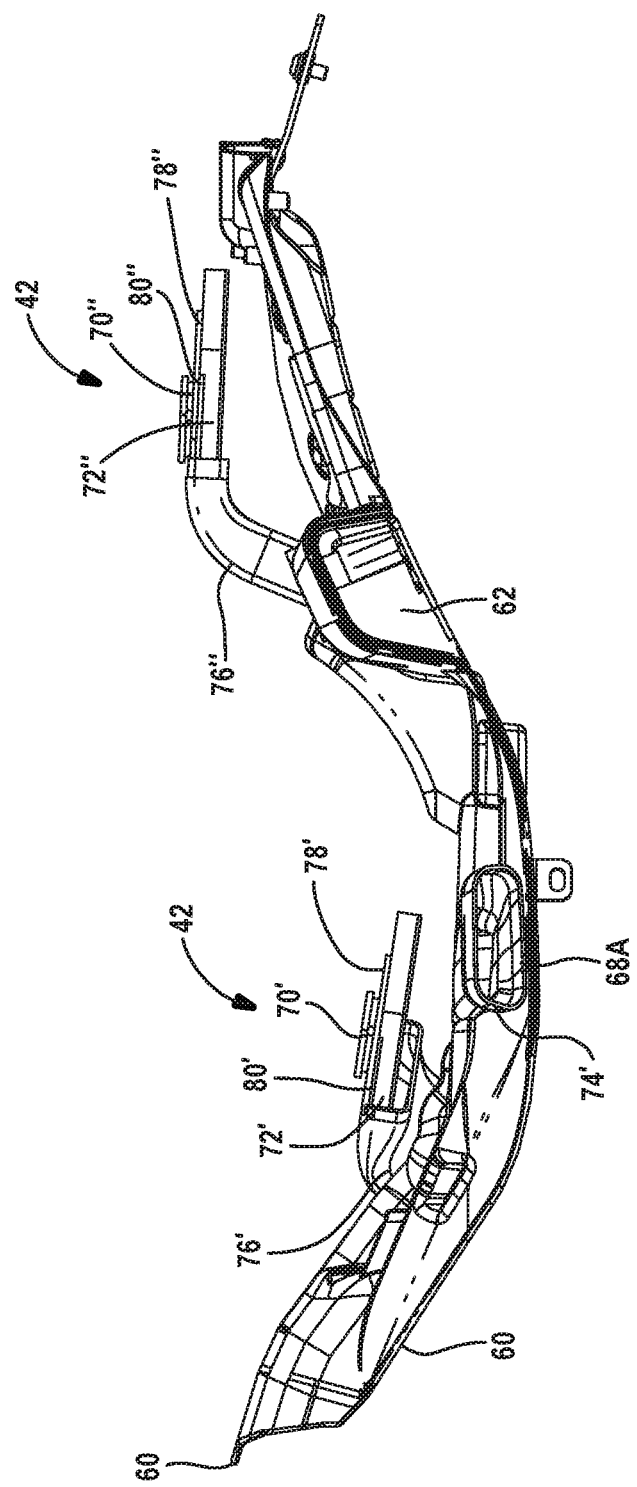
FIG. 6 is a side view of the seat pan having a passenger heating and cooling module and a driver heating and cooling module.
Figure 7A:
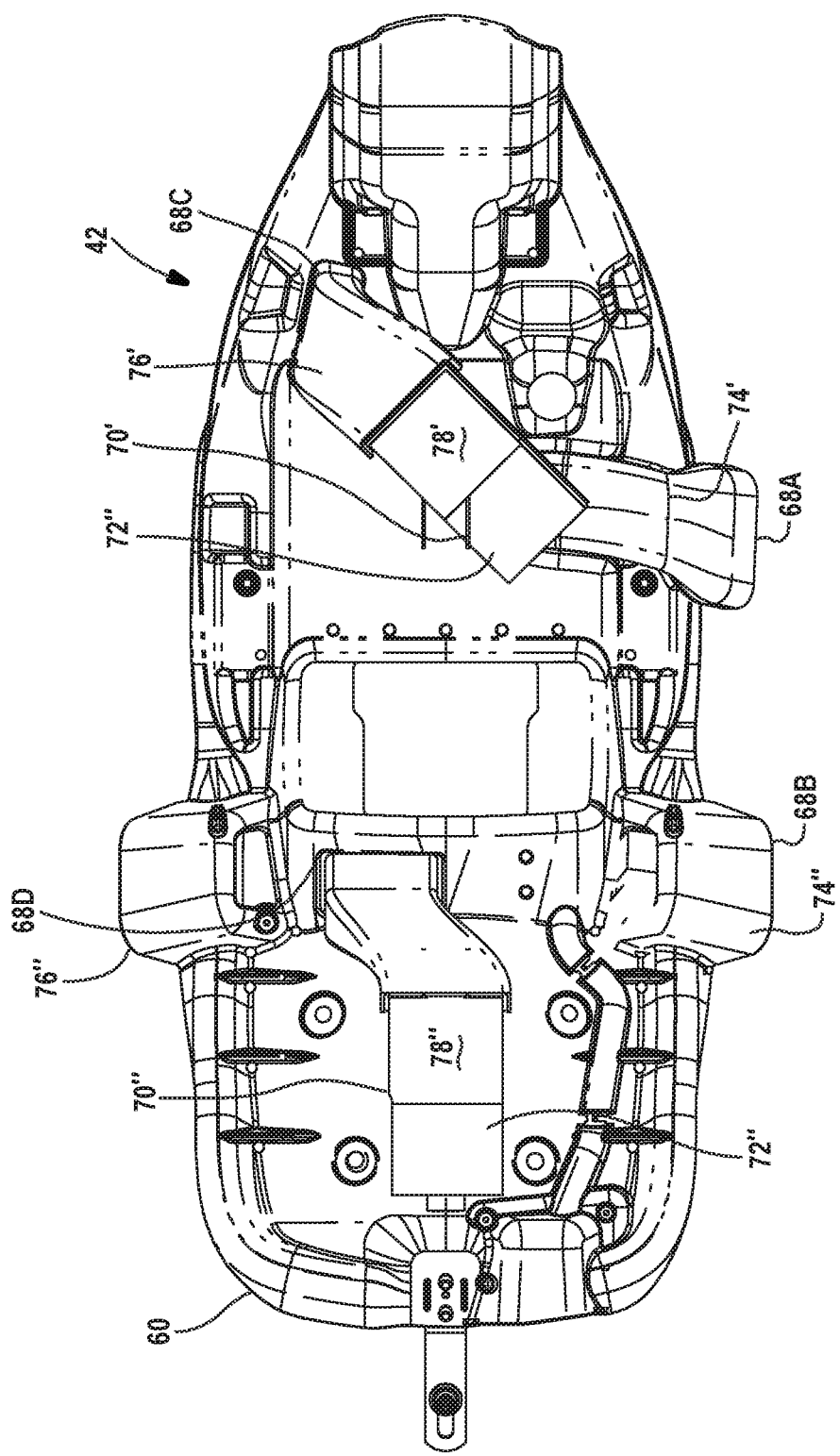
FIG. 7A is a top view of the seat pan having a passenger heating and cooling module and a driver heating and cooling module.
Figure 7B:
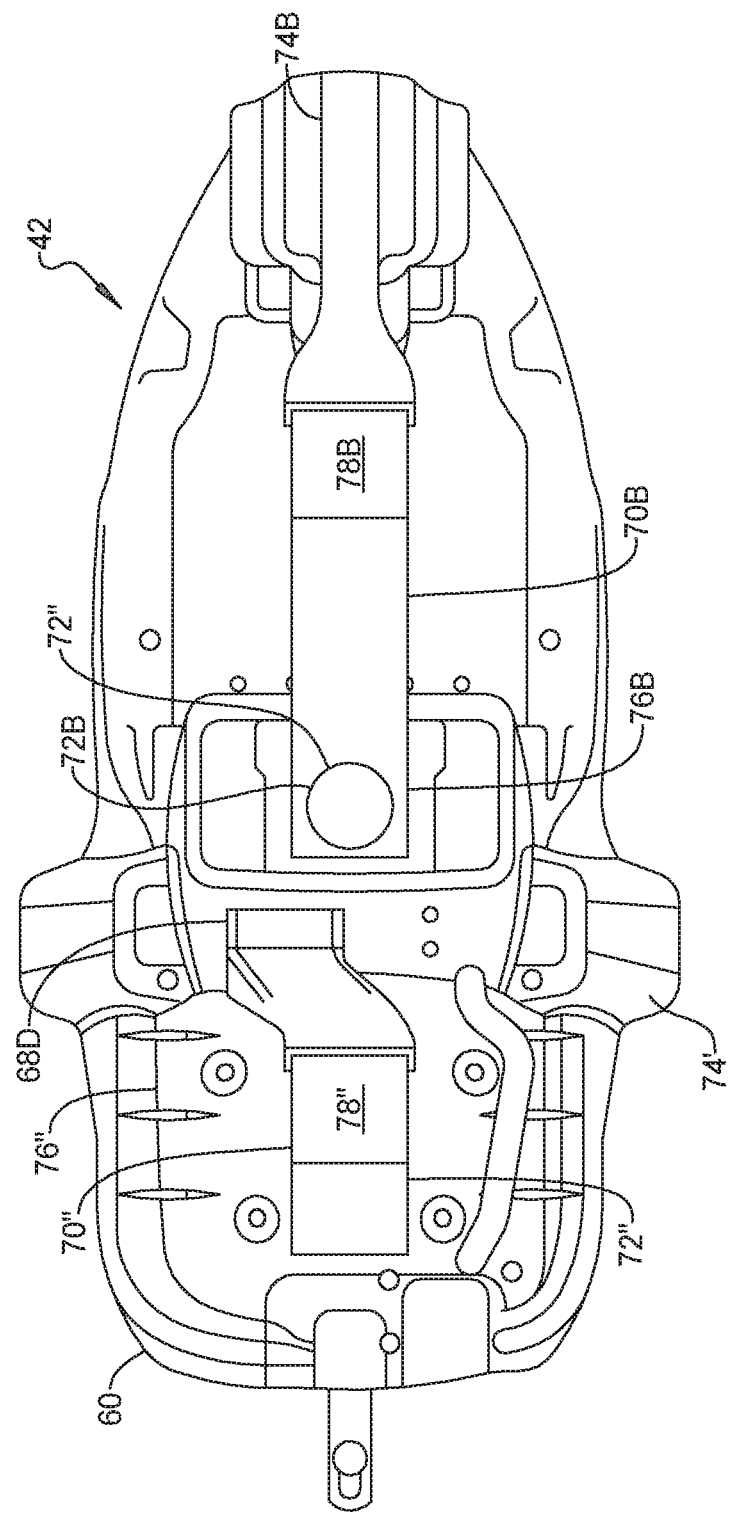
FIG. 7B is a first alternate top view of the seat pan having a passenger heating and cooling module and a driver heating and cooling module.
Figure 7C:
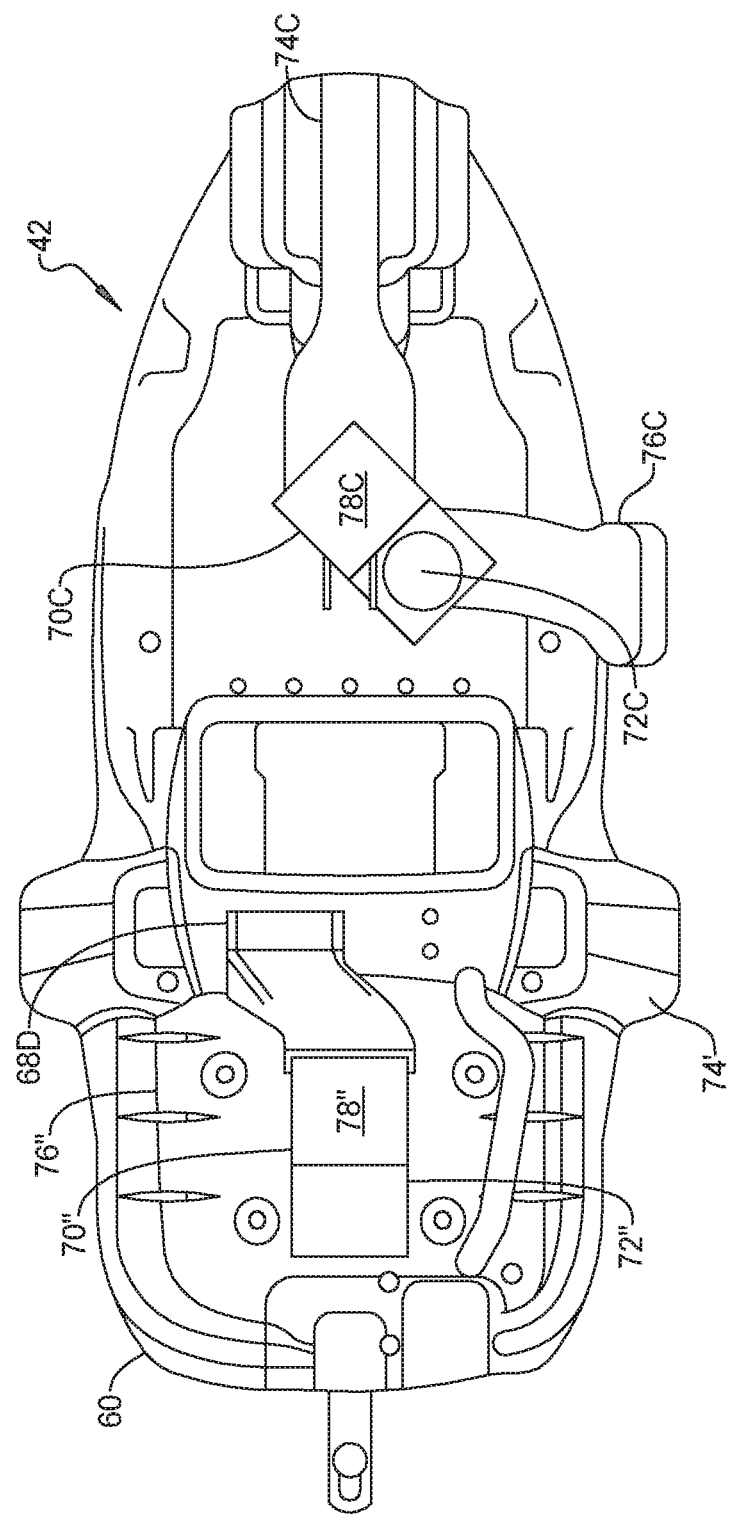
FIG. 7C is a second alternate top view of the seat pan having a passenger heating and cooling module and a driver heating and cooling module.
Figure 7D:
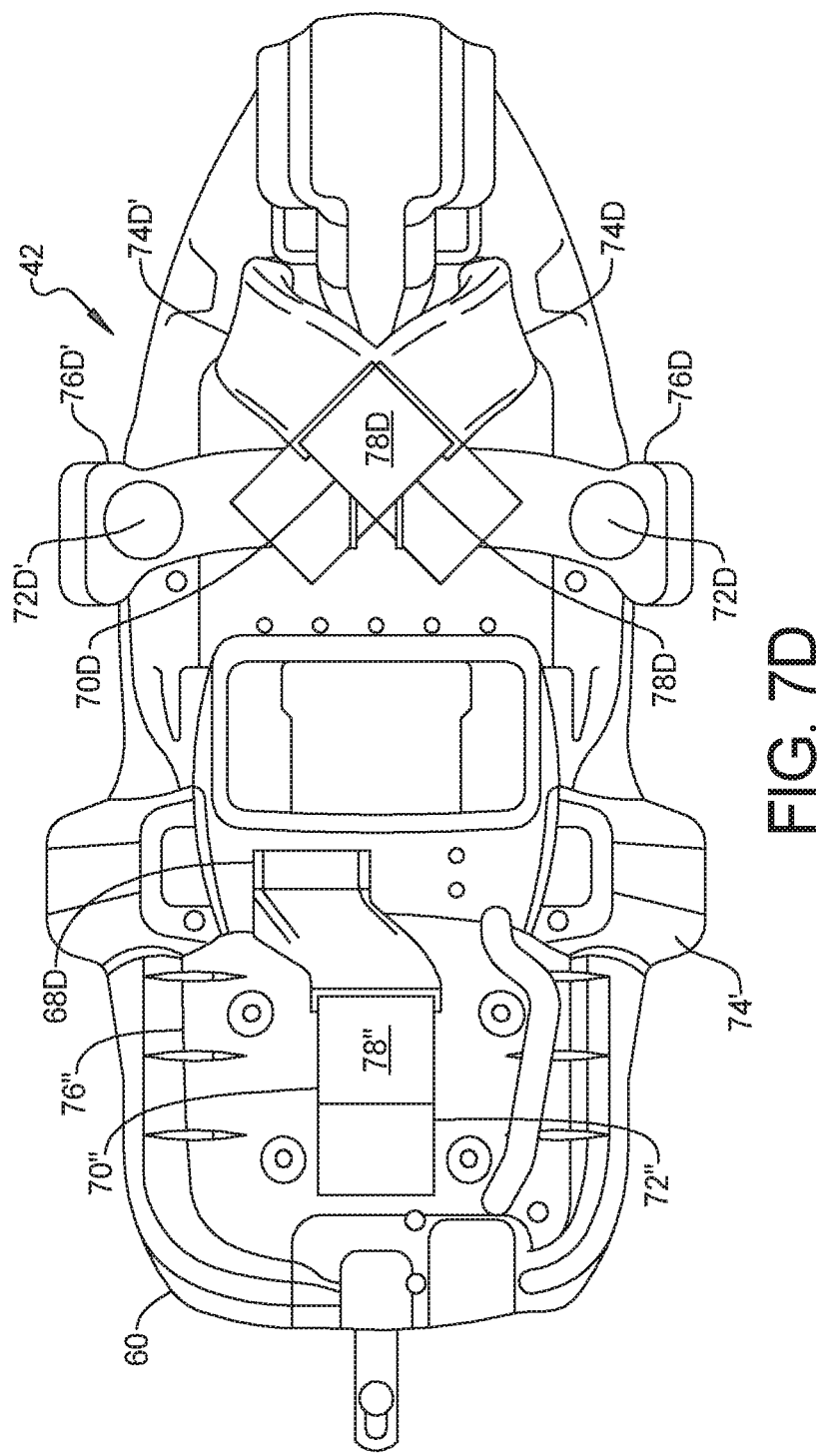
FIG. 7D is a third alternate top view of the seat pan having a passenger heating and cooling module and a driver heating and cooling module.
Figure 7E:
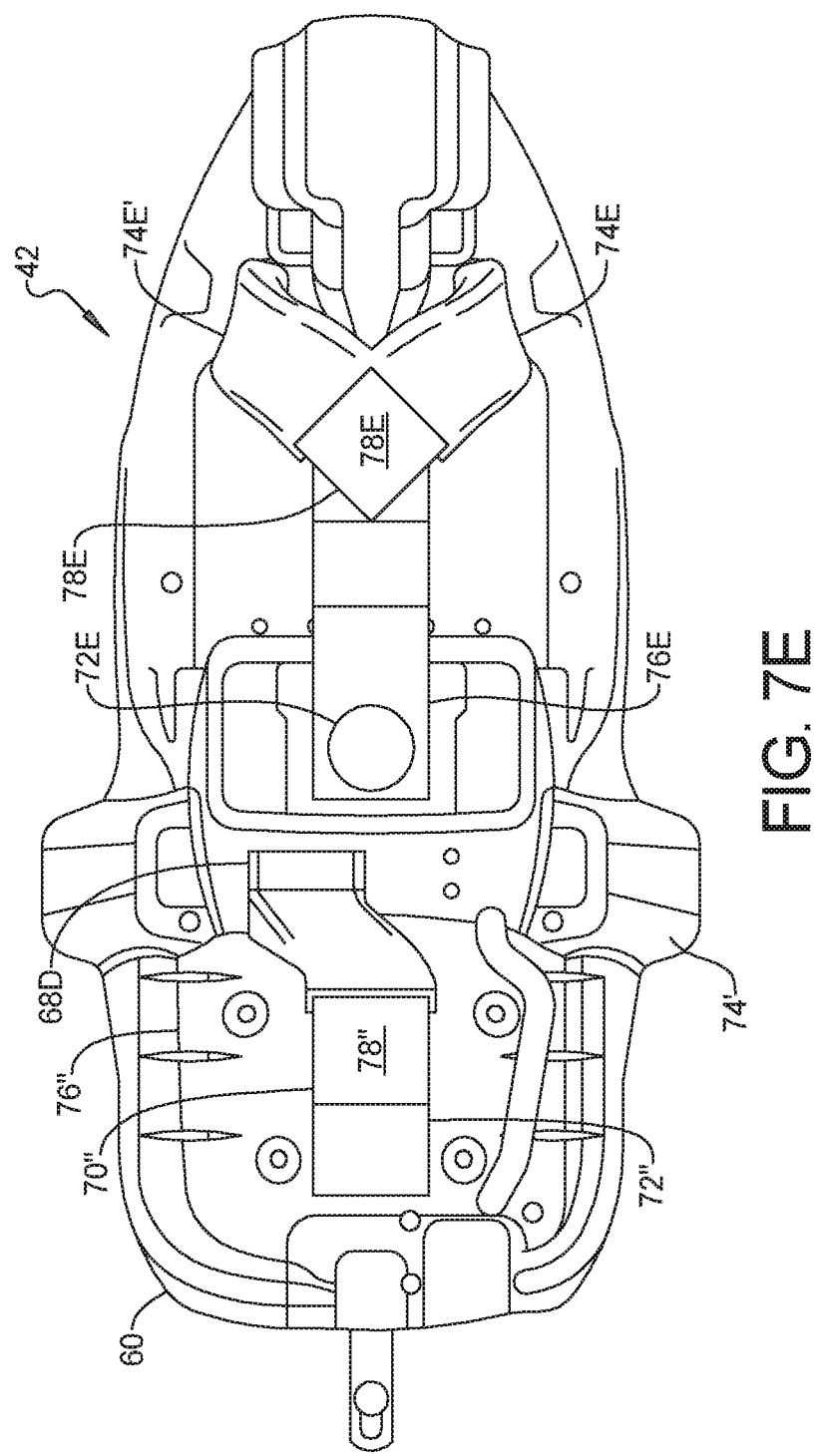
FIG. 7E is a fourth alternate top view of the seat pan having a passenger heating and cooling module and a driver heating and cooling module.
Figure 7F:
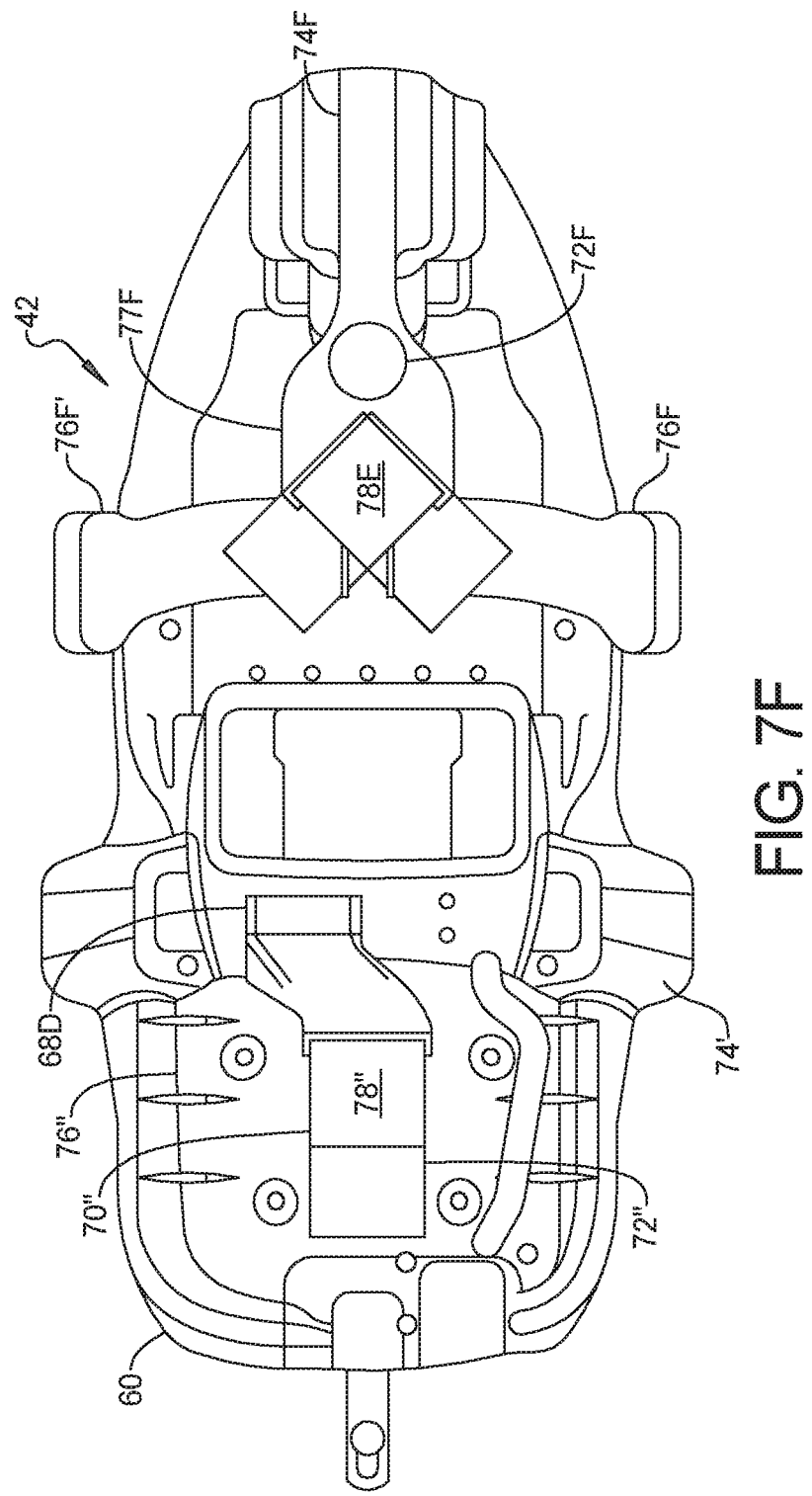
FIG. 7F is a fifth alternate top view of the seat pan having a passenger heating and cooling module and a driver heating and cooling module.
Figure 7G:
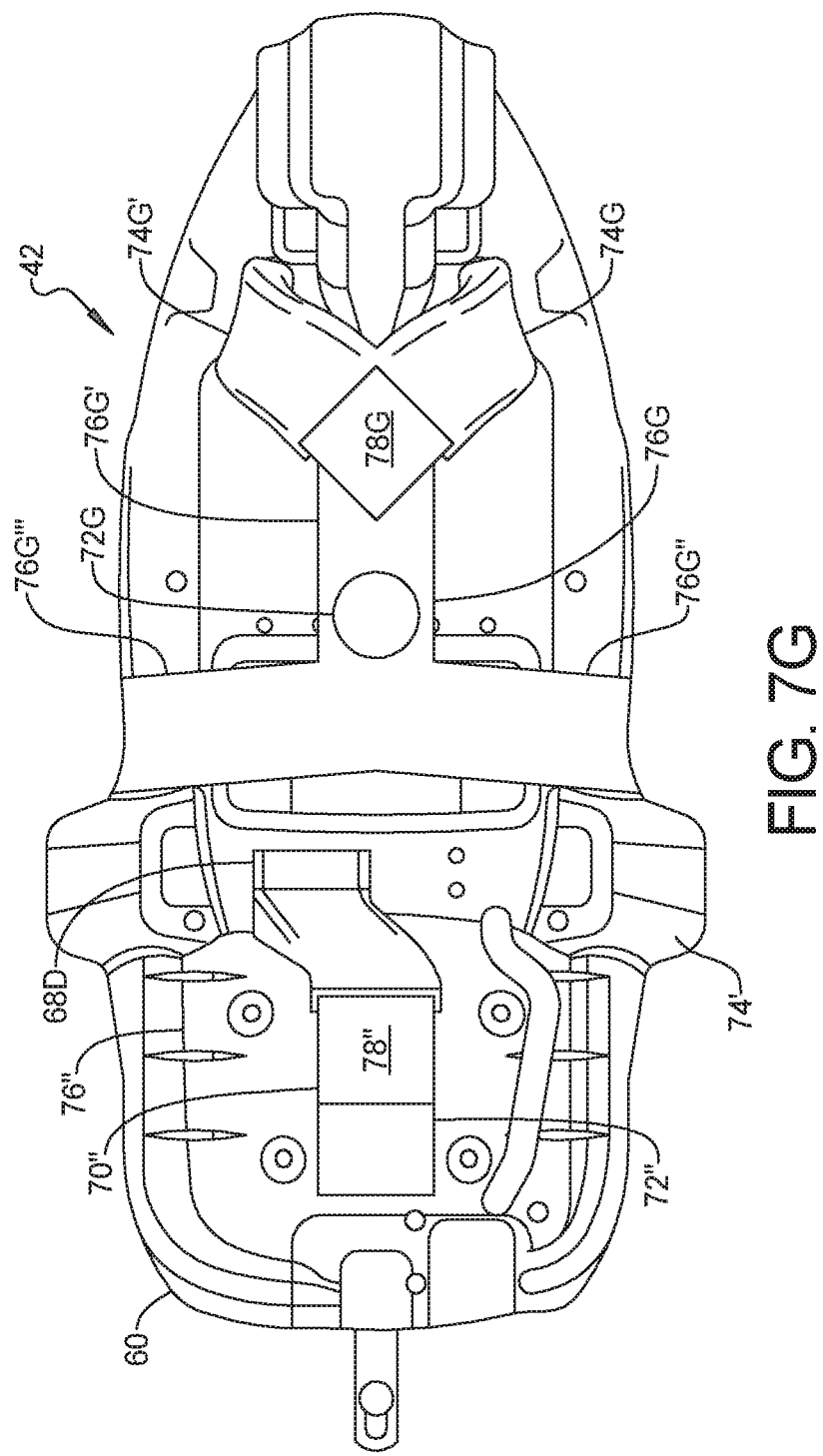
FIG. 7G is a sixth alternate top view of the seat pan having a passenger heating and cooling module and a driver heating and cooling module.
Figure 8:
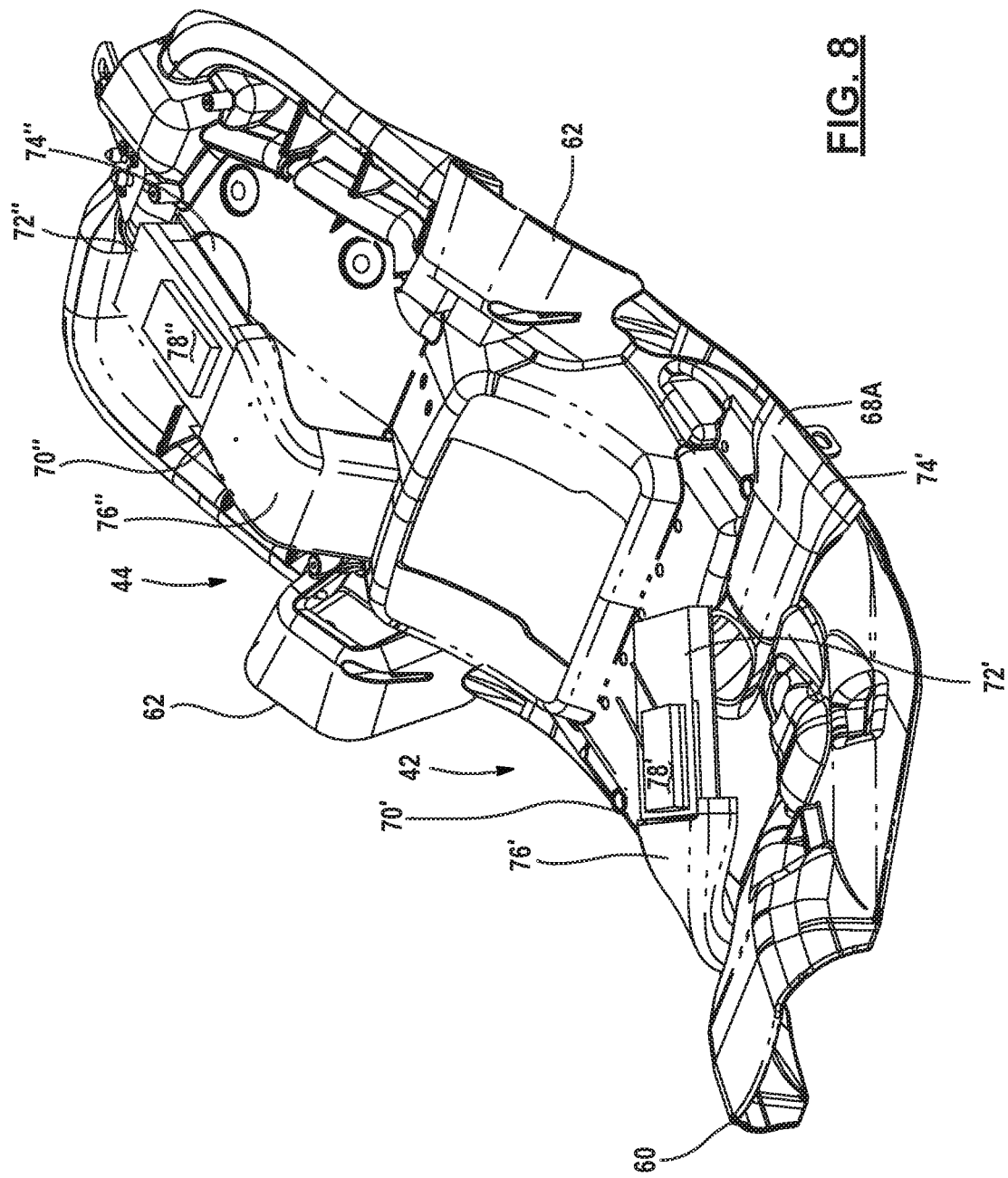
FIG. 8 is a perspective view of the seat pan having a passenger heating and cooling module and a driver heating and cooling module.

Referring now to FIGS. 6-8, a driver heating and cooling module 70' is illustrated in the driver position 42, while a passenger heating and cooling module 70" is illustrated in the passenger position 44. Each of the heating and cooling modules 70' and 70" may be configured in a similar manner to that set forth above with respect to the heating and cooling module 70 illustrated in FIGS. 5A-C. The heating and cooling modules 70' and 70" may operate in a similar way and may be independently controlled. Discrete switches or a controller area network (CAN) may be used for controlling the heating and cooling modules 70' and 70". Because of geometric limitations, the inlet air duct 74 and the outlet air duct 76, illustrated in FIGS. 5A-C, may be configured in different shapes for the heating and cooling modules 70' and 70". The same reference numerals are used as in FIGS. 5A-C except the use of a prime for the driver position and a double prime for the passenger position.

A driver heating and cooling module 70' is illustrated having the inlet air duct 74' extends in a lateral direction and may align with the port 68A in the seat pan 60 and port 50 in the seat cover illustrated in FIG. 3A. The port 50, as mentioned above, may be located on the cool side of the vehicle 10 on the opposite side as the exhaust pipe 26. This allows cooler air to be drawn in from the action caused by the fan 72'. In this example, the outlet air duct 76' is coupled to the seat pan 60. That is, the outlet air duct 76' may be coupled to exhaust air out of outlet poll 68C in the seat pan 60. In various examples, the heating and cooling module 70' may "float" within the cover support 56 or may be fixably mounted to the seat pan 60. Further, the cover support 56 may define the duct without a duct separate structure. That is, a tunnel or opening trough the foam of the cover support may define the air inlet and air outlet for all examples in FIGS. 7A-7H The passenger heating and cooling module 70" has an inlet air duct 74" aligned with the port 68B and an outlet air duct 76" aligned with the outlet port 68D. Of course various orientations and positions of inlet and outlet ports may be configured.

Referring now to FIG. 7B, an alternate orientation duct associated with the heating and cooling module 70B is set forth. In this example, the heating and cooling module 70B has a heat exchanger 78B. In this example, the inlet duct 74B provides inlet air to the heat exchanger 78B, the outlet duct 76B removes air from the heat exchanger 78B. A fan 72B moves the air through the inlet duct 74B and the outlet duct 76B. In this example, the inlet duct 74B and the outlet duct 76B are longitudinally disposed. In this example, the inlet duct 74B and the outlet duct 76B are in the middle of the seat pan 60. In the example set forth in FIG. 7B, the longitudinal axis of the seat corresponds to the longitudinal axis of the inlet duct 74B and the outlet duct 76B. The inlet duct 74B may align with a port in the cover (like so in FIG. 3A) expect in the appropriate position.

Referring now to FIG. 7C, the inlet duct 74C is positioned in a similar manner to that set forth in FIG. 7B. In this example, however, the outlet duct 76C is positioned toward a lateral side relative to the seat pan 60. The outlet duct 76C may align with the port in the seat cover. A fan 72C may be disposed in the outlet duct 76C to pull air through the heating and cooling module 70C, through the inlet duct 74C and past the heat exchanger 78C. In this example, the inlet duct 74C is aligned with the longitudinal axis of the seat pan 60. The outlet air duct 76C may be perpendicular to or at a slight angle to the perpendicular of the inlet duct 74C. The outlet duct 76C may be disposed on the hot side of the vehicle.

Referring now to FIG. 7D, the inlet duct may be formed from two inlet ducts 74D and 74D' disposed through the seat pan 60. In this example, the inlet to the seat ducts are disposed on each lateral side or half of the seat pan 60. The inlet ducts 74D and 74D' are disposed at about a 45° angle to the longitudinal axis of the seat pan 60. Although about a 45° is formed with the longitudinal axis and the inlet ducts 74D, 74D', various angles may be set forth.

In the example set forth in FIG. 7D, the single outlet duct shown above may be replaced by a pair of outlet ducts 76D and 76D'. Each outlet duct 76D, 76D', has a corresponding fan 72D and 72D'. The fans 72D and 72D' pull air through the inlet ducts 74D, 74D' through the heating and cooling module 70D and across a heat exchange 78D. Although not shown in this example, a pair of heat exchangers may also be used rather than a single heat exchanger. If a pair of heat exchangers are used, they may disposed in each of the outlet ducts 76D, 76D'. The ducts 76D, 76D' may be defined by the seat support rather than being a separate structure.

Referring now to FIG. 7E, a pair of inlet ducts 74E and 74E' are configured in a similar manner to that set forth in FIG. 7D. In this example, however, the outlet duct 76E is a singular outlet duct configured in a similar manner to that set forth in FIG. 7B. That is, the outlet duct 76E is disposed in a longitudinal manner extending from the heat exchanger 78E. A fan 72E is disposed in the outlet duct 78E. The outlet duct 76E may exhaust air beneath the seat pan 60.

Referring now to FIG. 7F, a longitudinally disposed inlet duct 74F having a fan 72F disposed therein may draw air into the inlet duct 74F and provide outlet air through the outlet duct 76F and 76F'. The heat exchanger 78F may be in fluid communication with the inlet duct 74F and the outlet ducts 76F and 76F'. The outlet ducts 76F and 76F' are disposed at an angle relative to the longitudinal axis of the seat pan 60.

A flared portion 77F is provided at the heat exchanger end of the inlet duct 74F to widen out the inlet duct connector to the heat exchanger 78F.

Referring now to FIG. 7G, the inlet duct is formed from a pair of inlet ducts 74G, 74G' in a similar manner to that set forth in FIG. 7E. The inlet ducts 74G, 74G' are in communication with the heat exchanger 78G. The outlet duct 76G extends from the heat exchanger 78G and forms a t-shape having a longitudinally extending portion 76G' that may coincide with the longitudinal axis of the seat pan 60. In this example, the portion 76G' includes the fan 72G. The portions 76G" and 76G'" extend perpendicularly from the base portion 76G' and extend to each side of the seat pan 60. Again, the outlet duct 76G, 76G" and 76G'" may be formed from a separate structure or within the seat cover support.

Referring now to FIG. 7H, the inlet duct 74H may be formed of a longitudinally extending portion 74H' that is generally conical in the longitudinal direction so that the wider portion is toward the front of the seat pan 60. The longitudinally extending portion 74H' includes two angularly disposed portions 74H" and 74H'" that extend to an angular direction relative to the longitudinal axis of the seat base 60 and extend to either side of the seat pan 60. A flat portion 74H'" may connect the inlet duct 74" and the inlet duct 74'". Again the duct portions 74H', 74H" and 74H'" may be formed within the seat cover support. Ports in the seat cover may align with the portions 74H" and 74H'".

The outlet duct 76H may be formed with a fan 72H therein. The duct 76H may be formed in a similar manner to that set forth in FIG. 7B. That is, the outlet duct 76H may be coincident with the longitudinal axis of the seat pan 60.

Referring now to FIGS. 9A-9F, the heating and cooling module 70 and the ducts 74, 76 associated therewith illustrated in FIG. 5A-C may be disposed in various positions within the seat assembly 40. The heating and cooling module 70 may be located in the driver or passenger position. The configuration of the inlet air duct 74 and the outlet air duct 76 may be located in various positions (or even eliminated) depending upon the configuration of the vehicle and the heating characteristics of the vehicle.

Figure 9A:
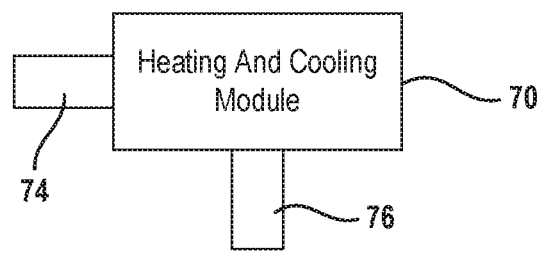
FIGS. 9A-9F are block diagrammatic views of a heating and cooling module having different positions for inlet air ducts and outlet air ducts.

FIG. 9A corresponds to a configuration having the inlet air duct 74 extending in a lateral position such as that illustrated in FIG. 6. The lateral position, as mentioned above, may be on the cooled side of the vehicle. The outlet air duct 76 may be directed in a vertically downward direction relative to the vehicle 10.

Figure 9B:
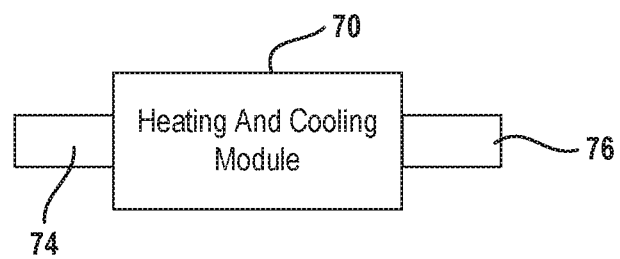

In FIG. 9B, the inlet air duct 74 is located in the same position as in FIG. 9A. However, the outlet air duct 76 is disposed in a lateral direction on the opposite side of the seat. The outlet air duct 76, in a motorcycle type vehicle, stay be directed to the heated side of the vehicle 10.

Figure 9C:
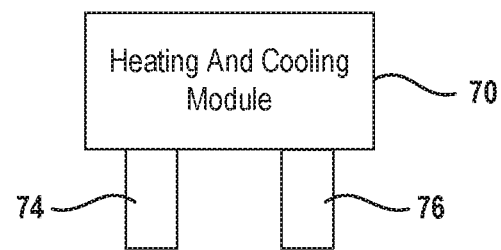

In FIG. 9C, the inlet air duct 74 and the outlet air duct 76 are directed beneath the seat assembly 40. The inlet air duct 74 and the outlet air duct 76 may be separated by the structure of the seat pan 60 or vehicle 10 so that outlet air is not drawn into the inlet air duct 74.

Figure 9D:
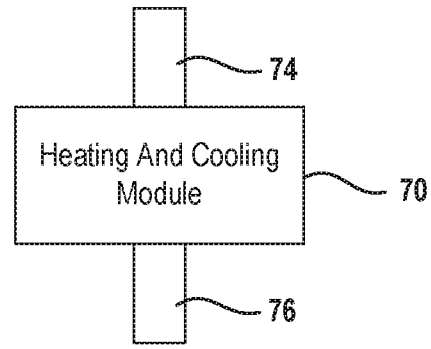

In FIG. 9D, heating and cooling module 70 may have the inlet air duct 74 disposed to draw air from above the seat and exhaust the air through the outlet air duct 76 below the seat.

Figure 9E:
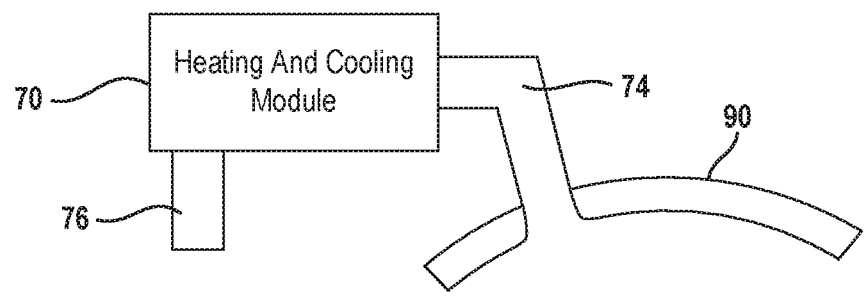

Referring now to FIG. 9E, the vehicle 10 may include a fender 90 having the inlet air duct 74 coupled thereto. The air within the fender 90 is relatively cool and thus the inlet air duct 74 draws in cooler air than may be around the vehicle engine. The outlet air duct 76 is directed beneath the seat.

Figure 9F:
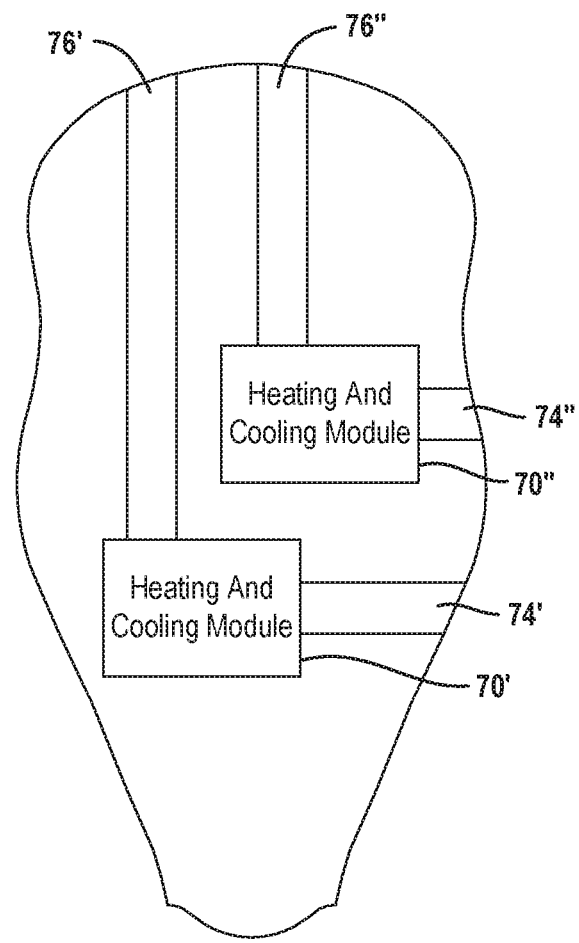

Referring now to FIG. 9F, a top view of a vehicle seat assembly 40 is set forth having the driver heating and cooling module 70' and the passenger heating and cooling module 70". In this example, the inlet air ducts 74', 74" are receiving air through the cooled side of the vehicle. The outlet air ducts 76', 76" are directed rearward and exhaust air through the rear portion of the seat. The rear portion of the seat may be the back side of the seat cover of at the rear portion of the seat pan.

Figure 10A:
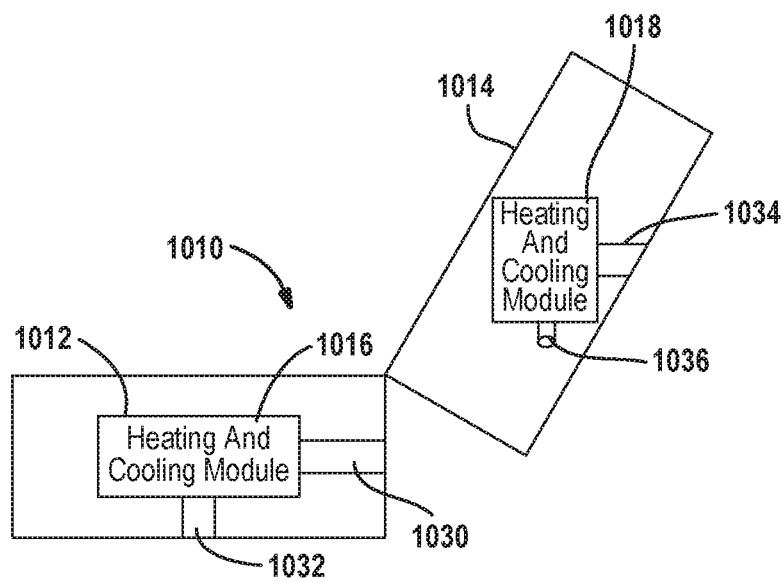
FIG. 10A is a side view of a two-part seat having heating and cooling modules in a seat back and a seat base.

Referring now to FIG. 10A, a seat 1010 is illustrated having a seat base 1012 and a seat back 1014. In this example, a heating and cooling module 1016 is located in the seat base 1012. A heating and cooling module 1018 is located in the seat back 1014. The configuration set forth in in FIG. 10A may be for a single passenger vehicle or may be for a side-by-side vehicle, as described below in FIG. 10B. Base heating and cooling module 1016 may include air ducts 1030 and 1032. Heating and cooling module 1018 may include air ducts 1034 and 1036. The air ducts 1030 and 1032 may be either inlet air ducts or outlet air ducts. That is, depending on the vehicle configuration or vehicle use, inlet and outlet may be desired from different positions within the vehicle. For example, air duct 1032 may be directed to the side of the seat base 1012. Exhaust air may be directed through the air duct 1030. However, air duct 1030 may also be an inlet air duct and air duct 1032 may represent an outlet air duct directed to the bottom of the seat base 1012. Likewise, air ducts 1034 and 1036 may be inlet or outlet air ducts. Air duct 1034 may be directed to draw air from the rear of the seat back 1014. Outlet air may be directed through the side of the vehicle through the air duct 1036. Likewise, inlet air may be drawn in through a side directed air duct 1036 and exhausted through air duct 1034.

Figure 10B:
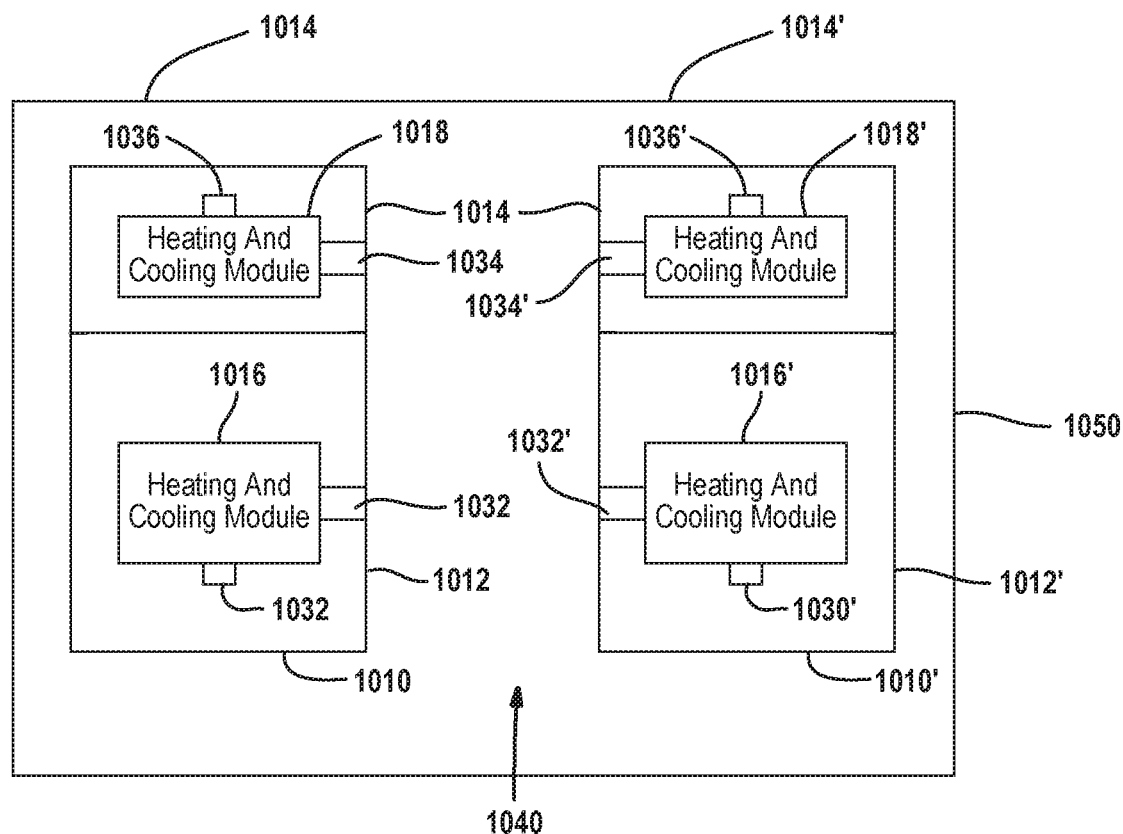
FIG. 10B is a diagrammatic view of the side-by-side vehicle having two seats corresponding to FIG. 10A.

Referring now to FIG. 10B, a representation of a side-by-side vehicle 1050 is illustrated. Two seats formed according to FIG. 10A are set forth. The air ducts 1032, 1032', 1034 and 1034' are directed to the space 1040 between the seats 1010 and 1010'. This may be especially desirable for muddy or dirty conditions. That is, the air ducts 1032 and 1032' are directed to the space 1040 between the seat base 1012 and the seat base 1012'. The air ducts 1034 and 1034' for inlet air to the heating and cooling modules 1018 and 1018' are directed to the space 1040 between the seat backs 1014 and 1014'. The air ducts 1030 and 1030' may be directed beneath the seats and, in particular, beneath the seat bases 1012, 1012', respectively. The air ducts 1036 and 1036' may be directed to the rear or below the seats.

Figure 11:
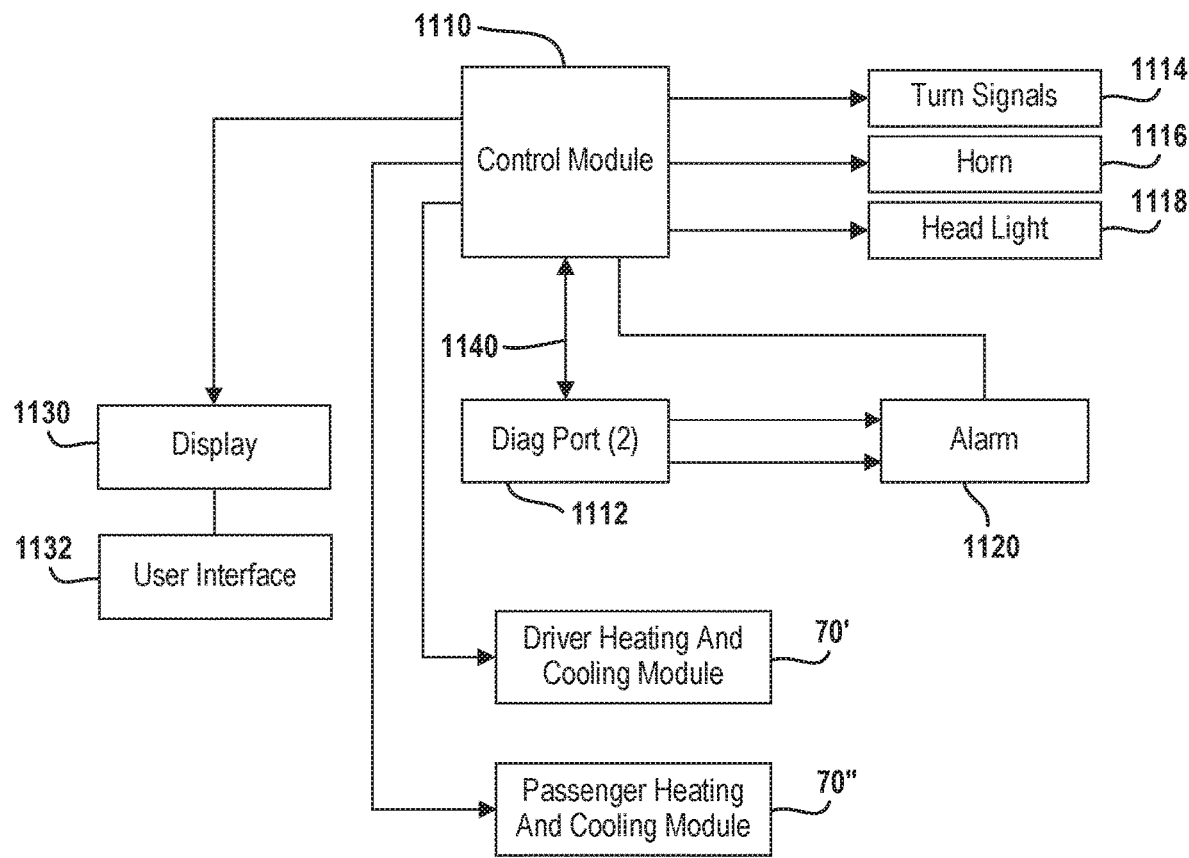
FIG. 11 is a block diagrammatic view of control system of a vehicle.

Referring now to FIG. 11, a control module 1110 is illustrated relative to various components of the vehicle. The control module 1110 may be in communication with various components such as turn signals 1114, a horn 1116 and a headlight 1118. The control module 1110 may also be in communication with a diagnostic port 1112 used for diagnostics of various components such as the engine. The control module 1110 may also control various engine functions. An alarm module 1120 may also be in communication with the control module 1110 to prevent theft of the vehicle. Of course, the functions performed by the control module 1110 may be performed by one or several microprocessors.

A display 1130 may be in communication with the control module 1110 for displaying various types of information or providing various controls. If the display 1130 is a touch screen, a user interface 1132 may be implemented as touch screen buttons displayed on the user interface 1132. The user interface 1132 may also be comprised of a plurality of discrete buttons located directly adjacent to the display 1130. The user interface 1132 may be used for inputting various key signals for performing various functions such as activating the heated and cooled seats and providing settings therefor. The control module 1110 may be in communication with the driver heating and cooling module 70' and the passenger heating and cooling module 70". Of course, the passenger heating and cooling module may be controlled through a seat-mounted bezel and is described in more detail below.

A controller area network 1140 may be used to intercommunicate between various components such as the display 1130, the control module 1110 and the heating and cooling modules 70', 70".

Figure 12:
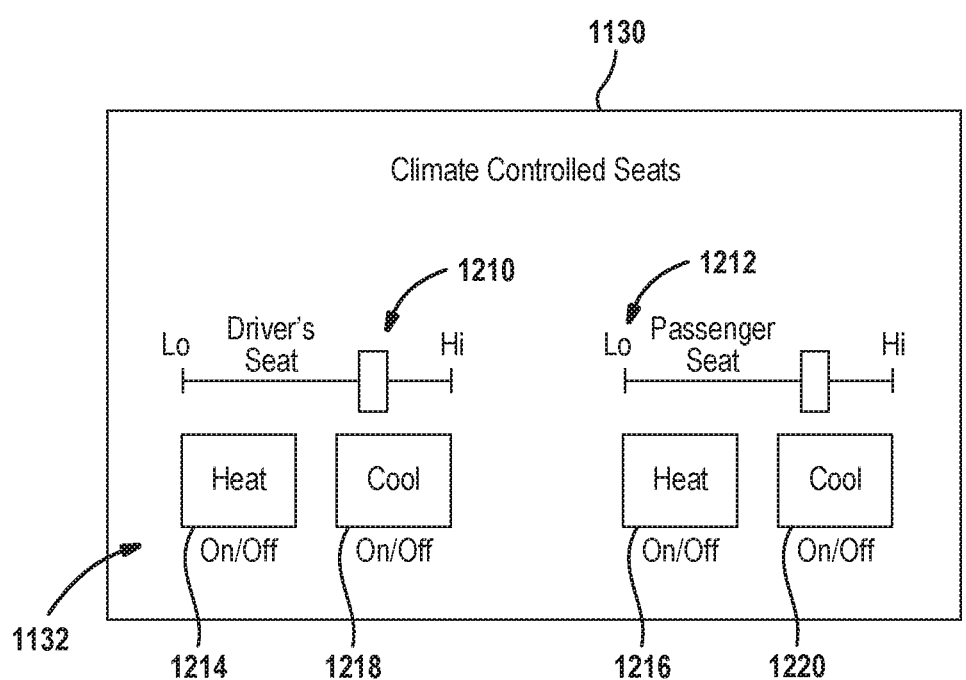
FIG. 12 is a diagrammatic view of a screen interface.

Referring now to FIG. 12, the display 1130 of FIG. 11 is illustrated in further detail. In this example, the display 1130 is a touch screen display that provides the user interface 1132. The user interface 1132 is used to provide signals from the touch screen for activating the heated and cooled seats for both the driver seat and passenger seat. However, the passenger seat control may be eliminated as the passenger seat may be controlled by a separate switch. In this example, a slide bar 1210 is used for providing an input for higher or lower activation of the heated and cooled seat. The passenger seat slide bar 1212 is also configured in a similar manner. The activation of the heated seats is performed using the user interface button 1214 for the driver seat or 1216 in the case of the passenger seat. Activation of the cooled seat is activated using the user interface button 1218 for the driver seat and 1220 for the passenger seat. The signals from the user interface buttons 1214-1220 and the slide bar 1210 and 1212 may be communicated through the controller area network 1140 of FIG. 11.

Figure 13A:
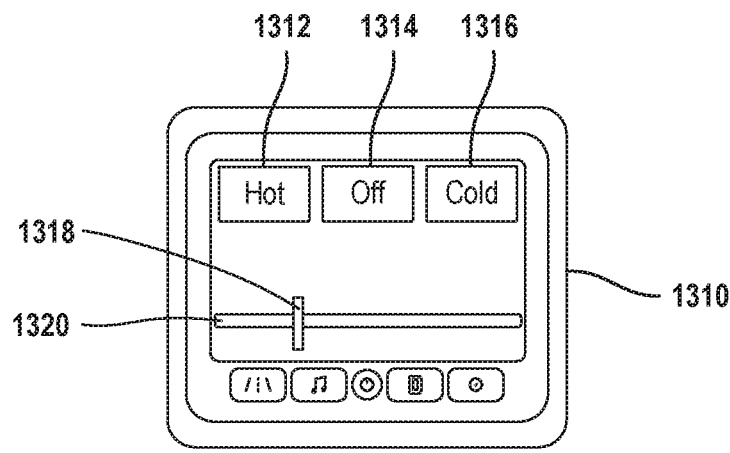
FIG. 13A is a diagrammatic view of a first switching apparatus for controlling the seat.
Figure 13B:
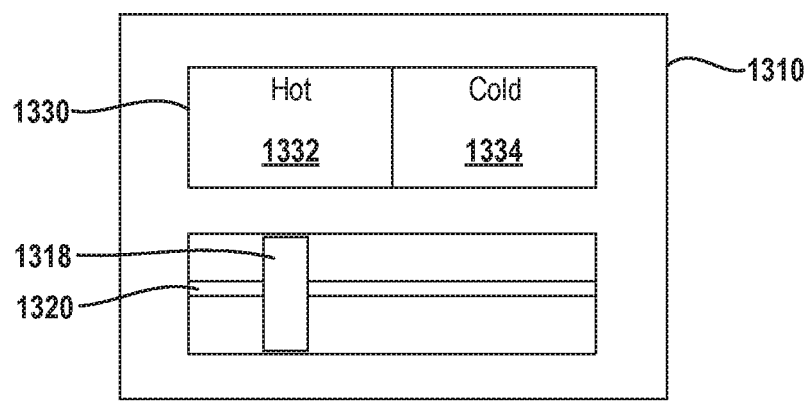
FIG. 13B is a diagrammatic view of a first alternate switching apparatus for controlling the seat.

Referring now to FIGS. 13A and 13B, a bezel 1310 is illustrated for housing discrete switches that may be used for either the passenger seat heating and cooling control or the driver seat heating and cooling control. As mentioned above, a bezel opening 62 may be provided in the seat for one or both of the bezels 1310 for control of the driver and passenger seat. Both the driver seat and passenger seat may be independently controlled through the implementation of different bezels. FIG. 13A includes a hot button 1312, a cold button 1314 and an off button 1316 that are pressed to activate the hot, cold or turn off the heated and cooled seats. A slide dial bar 1318 may be split within a track 1320 to control the intensity of the heat or the cooling.

Referring specifically to 13B, a rocker switch 1330 may be implemented having a neutral position for "off." Depressing the hot side 1332 activates the heating aspect of the seat while depressing the cold side 1334 rotates the rocker switch 1330 to activate the cooling aspect of the seat. A slide bar 1318 and track 1320 similar to that of 13A may be used to control the intensity of the heating or cooling as described above.

Figure 13C:
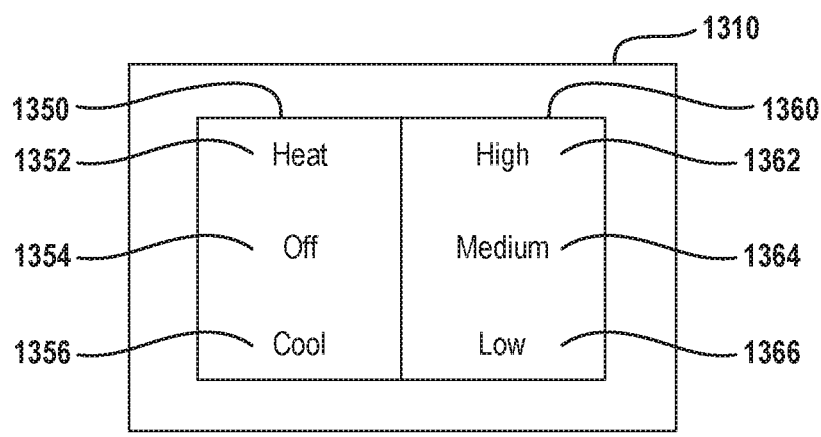
FIG. 13C is a diagrammatic view of a second alternate of the switching apparatus having two three position switches for controlling heating and cooling of the seat.

Referring now to FIG. 13C, the bezel 1310 may include two three position switches 1350, 1360. The switches 1350, 1360 may be toggle switches that have a neutral or middle position (untoggled), an up depressed position and a down depressed position. The switch 1350 in this example includes an upward depressed position 1352 that activates heating of the seat, a neutral position 1354 for off and a downward depressed position 1350 that activates cooling of the seat. The switch 1360 includes an upward depressed position 1362 that activates high for heating or cooling depending on the position of the first switch 1350, a neutral position 1364 that activates a medium level of heating and cooling and a downward depressed position 1366 that activates a low level of heating and cooling. Of course the positions could control different features and intensities.

Examples are provided so that this disclosure will be thorough, and will fully convey the scope to those who are skilled in the art. Numerous specific details are set forth such as examples of specific components, devices, and methods, to provide a thorough understanding of examples of the present disclosure. It will be apparent to those skilled in the art that specific details need not be employed, that examples may be embodied in many different forms and that neither should be construed to limit the scope of the disclosure. In some example embodiments, well-known processes, well-known device structures, and well-known technologies are not described in detail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat assembly for a vehicle having a longitudinal axis comprising:
   a seat pan;
   a cover support adjacent to the seat pan;
   a seat cover comprising an upper surface and a first cover longitudinally extending side surface and a second cover longitudinally extending side surface, wherein the seat pan comprises a first seat pan longitudinally extending side surface comprises a first port;
   a heating and cooling module disposed at least partially within the cover support; and
   a first air inlet in communication with the heating and cooling module, said first air inlet communicating air from the first port to the heating and cooling module, said first air inlet comprising an inlet air duct having a first end disposed adjacent to the first port and a second end coupled to the heating and cooling module; and
   an outlet air duct having a first end coupled to the heating and cooling module and a second end coupled to the seat pan.

2. The seat assembly as recited in claim 1 wherein the inlet air duct and the outlet air duct are disposed within the cover support.

3. The seat assembly as recited in claim 1 wherein the seat pan comprises an opening therethrough, said second end of said outlet air duct is coupled to the seat pan adjacent to the opening.

4. The seat assembly as recited in claim 1 further comprising a hydrophobic mesh extending across the first port.

5. The seat assembly as recited in claim 1 further comprising a second air inlet in communication with the heating and cooling module that communicates air from a second port to the heating and cooling module, said first port spaced apart from the second port.

6. The seat assembly as recited in claim 5 wherein the second port is disposed within the seat cover.

7. The seat assembly as recited in claim 1 further comprising a first air outlet and a second air outlet in communication with the heating and cooling module that communicates air from the heating and cooling module through the seat cover.

8. The seat assembly as recited in claim 1 wherein the heating and cooling module comprises a heat exchanger and a fan, said heat exchanger is disposed in the inlet air duct apart from the fan.

9. The seat assembly as recited in claim 1 wherein the heating and cooling module comprises a heat exchanger disposed in the inlet air duct together with a fan.

10. The seat assembly as recited in claim 1 wherein the heating and cooling module comprises a heat exchanger disposed in an outlet air duct together with a fan.

11. The seat assembly as recited in claim 1 wherein the heating and cooling module comprises a heat exchanger disposed in the outlet air duct separated from a fan.

12. The seat assembly as recited in claim 1 wherein the heating and cooling module is disposed in a first seating position and further comprising a second heating and cooling module disposed in a second seating position.

13. The seat assembly as recited in claim 1 wherein the seat pan comprises a service opening and a service panel removably coupled to the service opening, wherein the heating and cooling module is sized to be removed though the service opening of the seat pan.

14. A motorcycle comprising:
   a seat assembly as recited in claim 1;
   an engine;
   an exhaust pipe extending from the engine on a first side of the motorcycle;
   wherein said port is disposed on a second side opposite the first side, wherein the seat comprises a first position comprising the heating and cooling module and a second position comprising a second heating and cooling module.

15. The motorcycle as recited in claim 14 wherein the second heating and cooling module comprises a second inlet air duct directed beneath the seat pan and a second outlet air duct directed beneath the seat pan.

* * * * *